US011683706B2

(12) United States Patent
Barak et al.

(10) Patent No.: US 11,683,706 B2
(45) Date of Patent: Jun. 20, 2023

(54) OVER THE AIR DIGITAL PRE-DISTORTION MEASUREMENTS

(71) Applicant: QUALCOMM Incorporated, San Diego, CA (US)

(72) Inventors: Ori Barak, Beer Sheva (IL); Gideon Shlomo Kutz, Ramat Hasharon (IL); Assaf Touboul, Netanya (IL); Amit Bar-Or Tillinger, Tel-Aviv (IL); Ori Ben Shahar, Petach Tikva (IL)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 17/377,721

(22) Filed: Jul. 16, 2021

(65) Prior Publication Data

US 2023/0014042 A1    Jan. 19, 2023

(51) Int. Cl.
*H04W 24/10* (2009.01)
*H04L 5/00* (2006.01)
*H04B 17/309* (2015.01)
*H04W 24/08* (2009.01)
*H04L 25/02* (2006.01)

(52) U.S. Cl.
CPC .......... *H04W 24/08* (2013.01); *H04B 17/309* (2015.01); *H04L 5/0048* (2013.01); *H04L 25/0228* (2013.01)

(58) Field of Classification Search
None
See application file for complete search history.

(56) References Cited

U.S. PATENT DOCUMENTS

| 11,563,408 | B2* | 1/2023 | Rexberg | H04B 1/0475 |
| 2010/0285762 | A1* | 11/2010 | Ko | H04L 5/0048 |
| | | | | 455/127.1 |
| 2016/0380669 | A1* | 12/2016 | Liu | H04L 27/34 |
| | | | | 375/219 |
| 2018/0083744 | A1* | 3/2018 | Kim | H04L 5/005 |
| 2019/0089389 | A1 | 3/2019 | Gutman et al. | |
| 2019/0190552 | A1 | 6/2019 | Sagi et al. | |
| 2022/0077900 | A1* | 3/2022 | Farhadi | H04B 7/06 |

FOREIGN PATENT DOCUMENTS

| WO | WO-0163751 A1 * | 8/2001 | ........... H03F 1/3247 |
| WO | WO-2021062794 A1 | 4/2021 | |

OTHER PUBLICATIONS

International Search Report and Written Opinion—PCT/US2022/034081—ISA/EPO—Sep. 21, 2022.

\* cited by examiner

*Primary Examiner* — Duc T Duong
(74) *Attorney, Agent, or Firm* — Holland & Hart LLP

(57) ABSTRACT

Methods, systems, and devices for wireless communications are described. The method includes receiving, from a base station, control signaling identifying a measurement configuration for one or more non-linear estimation measurements of reference signals associated with a power amplifier configuration of the base station, receiving, from the base station, the reference signals on a set of resources identified by the measurement configuration, performing one or more non-linear estimation measurements associated with the power amplifier configuration of the base station based on the received reference signals, and transmitting, to the base station according to the measurement configuration, a measurement report based on the one or more non-linear estimation measurements.

30 Claims, 16 Drawing Sheets

OVER THE AIR DIGITAL PRE-DISTORTION MEASUREMENTS

FIELD OF TECHNOLOGY

The following relates to wireless communications, including over the air digital pre-distortion measurements.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless systems may include power amplifiers (PAs) that may be used to amplify transmissions. In some cases, PAs may exhibit nonlinear characteristics.

SUMMARY

The described techniques relate to improved methods, systems, devices, and apparatuses that support over the air digital pre-distortion measurements. Generally, the described techniques provide for a user equipment (UE) receiving control signaling from a base station associated with a power amplifier configuration of the base station. In some cases, the control signaling may include a measurement configuration for reference signals associated with the power amplifier configuration. In some cases, the UE may receive the reference signals on a set of resources identified by the measurement configuration and perform one or more non-linear estimation measurements on the received reference signals in relation to the power amplifier configuration. In some cases, the UE may transmit a measurement report to the base station. In some cases, the measurement report may be based on the one or more non-linear estimation measurements and the measurement configuration.

A method for wireless communication at a user equipment (UE) is described. The method may include receiving, from a base station, control signaling identifying a measurement configuration for one or more non-linear estimation measurements of reference signals associated with a power amplifier configuration of the base station, receiving, from the base station, the reference signals on a set of resources identified by the measurement configuration, performing one or more non-linear estimation measurements associated with the power amplifier configuration of the base station based on the received reference signals, and transmitting, to the base station according to the measurement configuration, a measurement report based on the one or more non-linear estimation measurements.

An apparatus for wireless communication at a UE is described. The apparatus may include a processor, memory coupled with the processor, and instructions stored in the memory. The instructions may be executable by the processor to cause the apparatus to receive, from a base station, control signaling identifying a measurement configuration for one or more non-linear estimation measurements of reference signals associated with a power amplifier configuration of the base station, receive, from the base station, the reference signals on a set of resources identified by the measurement configuration, perform one or more non-linear estimation measurements associated with the power amplifier configuration of the base station based on the received reference signals, and transmit, to the base station according to the measurement configuration, a measurement report based on the one or more non-linear estimation measurements.

Another apparatus for wireless communication at a UE is described. The apparatus may include means for receiving, from a base station, control signaling identifying a measurement configuration for one or more non-linear estimation measurements of reference signals associated with a power amplifier configuration of the base station, means for receiving, from the base station, the reference signals on a set of resources identified by the measurement configuration, means for performing one or more non-linear estimation measurements associated with the power amplifier configuration of the base station based on the received reference signals, and means for transmitting, to the base station according to the measurement configuration, a measurement report based on the one or more non-linear estimation measurements.

A non-transitory computer-readable medium storing code for wireless communication at a UE is described. The code may include instructions executable by a processor to receive, from a base station, control signaling identifying a measurement configuration for one or more non-linear estimation measurements of reference signals associated with a power amplifier configuration of the base station, receive, from the base station, the reference signals on a set of resources identified by the measurement configuration, perform one or more non-linear estimation measurements associated with the power amplifier configuration of the base station based on the received reference signals, and transmit, to the base station according to the measurement configuration, a measurement report based on the one or more non-linear estimation measurements.

In some examples of the method, apparatuses, and non-transitory computer-readable medium described herein, receiving the reference signals may include operations, features, means, or instructions for receiving a non-linear estimation reference signal on resources identified by the measurement configuration, the one or more non-linear estimation measurements performed on the non-linear estimation reference signal.

In some examples of the method, apparatuses, and non-transitory computer-readable medium described herein, the UE may be configured to communicate data signals on a first carrier, and receiving the control signaling identifying the measurement configuration may include operations, features, means, or instructions for receiving the control signaling identifying the measurement configuration, where the measurement configuration indicates that the set of resources on which the reference signals may be to be transmitted include at least a second carrier adjacent the first carrier and a third carrier adjacent the first carrier.

Some examples of the method, apparatuses, and non-transitory computer-readable medium described herein may further include operations, features, means, or instructions for performing one or more adjacent channel leakage ratio measurements on the reference signals on the second carrier, or the third carrier, or any combination thereof, the measurement configuration indicating for the UE to perform the one or more adjacent channel leakage ratio measurements.

In some examples of the method, apparatuses, and non-transitory computer-readable medium described herein, the UE may be configured to communicate data signals on a carrier, and receiving the control signaling identifying the measurement configuration may include operations, features, means, or instructions for receiving the control signaling identifying the measurement configuration, where the measurement configuration indicates a first frequency region of the carrier, a second frequency region of the carrier, and a third frequency region of the carrier that may have a frequency range between the first frequency region and the second frequency region, where the set of resources on which the reference signals may be to be transmitted include the third frequency region, and the one or more non-linear estimation measurements may be performed on the reference signals received in the third frequency region of the carrier.

Some examples of the method, apparatuses, and non-transitory computer-readable medium described herein may further include operations, features, means, or instructions for generating at least one coefficient of a digital pre-distortion model based on the received reference signals and transmitting an indication of the generated at least one coefficient to the base station.

Some examples of the method, apparatuses, and non-transitory computer-readable medium described herein may further include operations, features, means, or instructions for determining whether an age of a coefficient of a digital pre-distortion model satisfies an age threshold, where the measurement report indicates whether the age of the coefficient satisfies the age threshold.

In some examples of the method, apparatuses, and non-transitory computer-readable medium described herein, performing the one or more non-linear estimation measurements may include operations, features, means, or instructions for determining whether the one or more non-linear estimation measurements satisfy the performance threshold for the digital pre-distortion model and transmitting, to the base station, an indication of whether the one or more non-linear estimation measurements satisfy the performance threshold.

In some examples of the method, apparatuses, and non-transitory computer-readable medium described herein, the measurement report includes a 1-bit value indicating whether the one or more non-linear estimation measurements satisfy the performance threshold, the indication including the 1-bit value. In some examples of the method, apparatuses, and non-transitory computer-readable medium described herein, the reference signals include demodulation reference signals.

In some examples of the method, apparatuses, and non-transitory computer-readable medium described herein, performing the one or more non-linear estimation measurements may include operations, features, means, or instructions for performing the one or more non-linear estimation measurements to determine an error vector magnitude, an adjacent channel leakage power ratio, a received power, a ratio of nonlinear kernel energy to linear kernel energy, a mean square error of a weighted least squares of a digital pre-distortion estimation, a subset of kernels associated with a digital pre-distortion model, or any combination thereof.

A method for wireless communication at a base station is described. The method may include transmitting, to a UE, control signaling identifying a measurement configuration for one or more non-linear estimation measurements of reference signals associated with a power amplifier configuration of the base station, transmitting the reference signals on a set of resources identified by the measurement configuration, receiving, from the UE, a measurement report indicating one or more non-linear estimation measurements of reference signals performed associated with the power amplifier configuration of the base station by the UE according to the measurement configuration, adjusting the power amplifier configuration of the base station based on the received measurement report, and transmitting signals to the UE using the adjusted power amplifier configuration.

An apparatus for wireless communication at a base station is described. The apparatus may include a processor, memory coupled with the processor, and instructions stored in the memory. The instructions may be executable by the processor to cause the apparatus to transmit, to a UE, control signaling identifying a measurement configuration for one or more non-linear estimation measurements of reference signals associated with a power amplifier configuration of the base station, transmit the reference signals on a set of resources identified by the measurement configuration, receive, from the UE, a measurement report indicating one or more non-linear estimation measurements of reference signals performed associated with the power amplifier configuration of the base station by the UE according to the measurement configuration, adjust the power amplifier configuration of the base station based on the received measurement report, and transmit signals to the UE using the adjusted power amplifier configuration.

Another apparatus for wireless communication at a base station is described. The apparatus may include means for transmitting, to a UE, control signaling identifying a measurement configuration for one or more non-linear estimation measurements of reference signals associated with a power amplifier configuration of the base station, means for transmitting the reference signals on a set of resources identified by the measurement configuration, means for receiving, from the UE, a measurement report indicating one or more non-linear estimation measurements of reference signals performed associated with the power amplifier configuration of the base station by the UE according to the measurement configuration, means for adjusting the power amplifier configuration of the base station based on the received measurement report, and means for transmitting signals to the UE using the adjusted power amplifier configuration.

A non-transitory computer-readable medium storing code for wireless communication at a base station is described. The code may include instructions executable by a processor to transmit, to a UE, control signaling identifying a measurement configuration for one or more non-linear estimation measurements of reference signals associated with a power amplifier configuration of the base station, transmit the reference signals on a set of resources identified by the measurement configuration, receive, from the UE, a measurement report indicating one or more non-linear estimation measurements of reference signals performed associated with the power amplifier configuration of the base station by the UE according to the measurement configuration, adjust the power amplifier configuration of the base station based on the received measurement report, and transmit signals to the UE using the adjusted power amplifier configuration.

In some examples of the method, apparatuses, and non-transitory computer-readable medium described herein, transmitting the reference signals may include operations, features, means, or instructions for transmitting a non-linear estimation reference signal on resources identified by the measurement configuration.

In some examples of the method, apparatuses, and non-transitory computer-readable medium described herein, the UE may be configured to communicate data signals on a first carrier, and transmitting the control signaling identifying the measurement configuration may include operations, features, means, or instructions for transmitting the control signaling identifying the measurement configuration, where the measurement configuration indicates that the set of resources on which the reference signals may be to be transmitted include at least a second carrier adjacent the first carrier and a third carrier adjacent the first carrier.

In some examples of the method, apparatuses, and non-transitory computer-readable medium described herein, the UE may be configured to communicate data signals on a carrier, and receiving the control signaling identifying the measurement configuration may include operations, features, means, or instructions for transmitting the control signaling identifying the measurement configuration, where the measurement configuration indicates a first frequency region of the carrier, a second frequency region of the carrier, and a third frequency region of the carrier that may have a frequency range between the first frequency region and the second frequency region, where the set of resources on which the reference signals may be to be transmitted include the third frequency region, and the one or more non-linear estimation measurements may be performed on the reference signals received in the third frequency region of the carrier.

In some examples of the method, apparatuses, and non-transitory computer-readable medium described herein, the power amplifier configuration may be based a digital pre-distortion model and the method, apparatuses, and non-transitory computer-readable medium may include further operations, features, means, or instructions for receiving, in the measurement report or in a coefficient report, an indication of at least one coefficient of the digital pre-distortion model from the UE and adjusting the power amplifier configuration based on the at least one coefficient.

In some examples of the method, apparatuses, and non-transitory computer-readable medium described herein, the power amplifier configuration may be based a digital pre-distortion model and the method, apparatuses, and non-transitory computer-readable medium may include further operations, features, means, or instructions for receiving, in the measurement report or in a coefficient report, an indication of whether an age of a coefficient of the digital pre-distortion model satisfies an age threshold and signaling the UE to update the coefficient based on the age of the coefficient failing to satisfy the age threshold.

In some examples of the method, apparatuses, and non-transitory computer-readable medium described herein, receiving the measurement report from the UE may include operations, features, means, or instructions for receiving, from the UE, an indication of whether the one or more non-linear estimation measurements performed by the UE satisfy the performance threshold for the digital pre-distortion model.

In some examples of the method, apparatuses, and non-transitory computer-readable medium described herein, the measurement report includes an indication of an error vector magnitude, an adjacent channel leakage power ratio, a received power, a ratio of nonlinear kernel energy to linear kernel energy, a mean square error of a weighted least squares of a digital pre-distortion estimation, a subset of kernels associated with a digital pre-distortion model, or any combination thereof.

DETAILED DESCRIPTION

Figure 1:
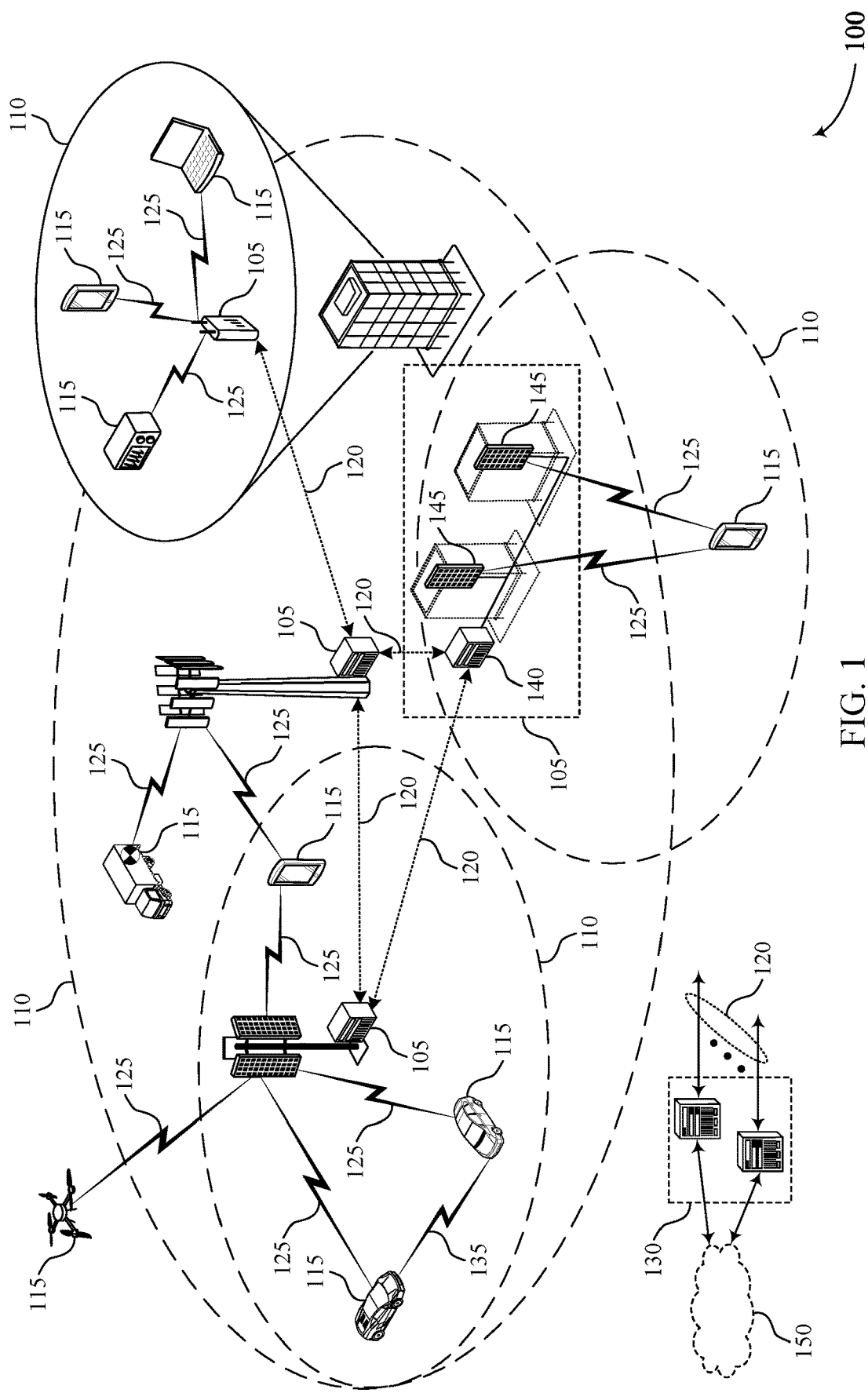
FIG. 1 illustrates an example of a wireless communications system that supports over the air digital pre-distortion measurements in accordance with aspects of the present disclosure.

The present techniques include over the air digital pre-distortion measurements. Wideband signals are spectrally more efficient than signals that are relatively narrower band. However, wideband signals are amplified by power amplifiers (PAs), which are inherently nonlinear. The nonlinearity of PAs may generate spectral re-growth, which leads to adjacent channel interference and violations of out-of-band emission constraints set by regulatory bodies. The nonlinearity of PAs may also cause in-band distortion, which degrades the bit error rate (BER) performance of transmitted signals.

In some cases, PA non-linearity response estimation may distort a transmitted signal due to a high peak to average power ratio (PAPR). In some cases, the non-linear distortions may be classified as in-band distortion, which affects link performance in the sense of mutual information (MI) or error vector magnitude (EVM), or both, as well as out-band distortion, which may dictate the amount of adjacent channel interference (ACI) that may be tolerated by a given system, the ACI indicating how much an adjacent channel is polluted or distorted by a main channel transmission.

To reduce the nonlinearity and avoid distortion, the PA of some systems may be operated at a lower power (backed off) so that the PA operates within the linear portion of its operating curve. However, as power back-off increases, power efficiency decreases, resulting in less power being transmitted to the channel. In some cases, digital pre-distortion (DPD) may be used in the transmitter's digital front end (DFE) to complement power back-off. PA non-linearity response estimation may be based on DPD at the base station, or over-the-air DPD (OTA-DPD) at the UE. By complementing power back-off with DPD, the amount of distortions may be kept at or below some target level, while the power back-off is reduced (e.g., reduced to a selected back-off level, reduced below a back-off threshold, etc.), and hence PA efficiency may be maintained. DPD operation may include signal sensing at an associated radio frequency (RF) circuit. In some cases, the transmitted signal, from one or more PAs (e.g., all PAs) may be received and measured for non-linearity estimation.

In some cases, a Volterra filter may be used with DPD to cancel nonlinear and linear interference. A Volterra series is a model for non-linear behavior similar to a Taylor series, but differing from the Taylor series in its ability to capture memory effects. While the Taylor series may be used for approximating the response of a nonlinear system to a given input at a particular time, the Volterra series may be used for approximating the response of a nonlinear system at all other times. Thus, the Volterra series provides the ability to capture the memory effect of devices like capacitors and inductors. In some cases, transmit I-Q baseband samples may be inputted into a non-linear state generator of a Volterra filter. Next, the Volterra filter may output a weighted sum of the Volterra states weighted by coefficients (w). In some cases, a weight estimation unit of a UE or a base station, or both, may calculate the coefficients (e.g., coefficients of a digital pre-distortion model). In some cases, an error signal may be generated by subtracting the Volterra filter output a from the composite observation signal y(k) on the receiver path, which includes the desired received signal plus the distortion. In some cases, feedback (e.g., residual error post cancellation feedback fed back to the weight estimation unit) may be used to iteratively adapt the weights of the Volterra filter using a recursive algorithm for mean squared error (MSE) minimization. Examples of the recursive algorithm may include a least mean square (LMS) algorithm (e.g., LMS filter) or a recursive least squares (RLS) algorithm (e.g., RLS filter).

In some cases, a base station may perform non-linearity estimation to adjust the power supply of a PA or adjust the transmit signal power. However, some base stations (e.g., 5G NR base stations) may include an antenna array that is configured with a relatively large number of antennas. In some cases, performing non-linearity estimation on such relatively large transmit antenna arrays may result in relatively large numbers of feedback measurements (e.g., relatively large number of feedback links). In some cases, the computational costs of the feedback measurements on such relatively large transmit antenna arrays may be impractical due to the adverse effects these computational costs may have on the performance of the base stations. Other challenges may include verifying or quantifying a quality of a DPD training process and determining an age of DPD coefficients.

The present techniques provide signaling for a base station to provide a configuration to a UE instructing the UE to perform measurements related to a DPD model that models an output of a power amplifier (e.g., a DPD-based model of a PA response based on a given inputs). In some cases, the UE performs measurements on known reference signals provided by the base station to train the DPD model. The measurements may include power measurements on a main channel carrying a reference signal and adjacent channels carrying reference signals, including measurements of interference on the adjacent channels caused by the main channel. The UE then provides feedback to the base station based on the measurements.

The base station may make adjustments (e.g., fine tuning adjustments) to the DPD model based on the feedback provided by the UE. In some cases, the feedback may include coefficients of the DPD model calculated by the UE in accordance with the measurements. In some cases, the adjustments to the DPD model may be based on the coefficients calculated by the UE. In some cases, the base station may calculate coefficients (e.g., fine tune the coefficients) for the DPD model based on the values of the coefficients calculated and provided by the UE. In some cases, the base station may determine an age of coefficients of the DPD model based on the feedback from the UE. In some cases, the base station may verify a convergence of a DPD model training process (e.g., how well an expected output of the DPD model matches an actual output of the DPD model) based on the feedback provided by the UE.

Aspects of the subject matter described herein may be implemented to realize one or more advantages. The described techniques may support improvements in system efficiency such that a UE may perform over the air digital pre-distortion measurements that decrease the number of feedback measurements and computational costs of the feedback measurements by shifting computation from the base station to the UE. Additionally, the described operations of the UE verify a quality of a DPD training process and determine an age of DPD coefficients while maintaining a performance level of the base station (e.g., maintaining a power efficiency of power available to a given channel). Additionally, the described operations of the UE decrease in-band distortion and spectral re-growth, which results in adjacent channel interference being reduced and the bit error rate (BER) performance being maintained. Additionally, described techniques may result in avoiding multiple retransmissions and failed transmissions, decreasing system latency, improving signal quality, and improving user experience.

Aspects of the disclosure are initially described in the context of wireless communications systems. Aspects of the disclosure are further illustrated by and described with reference to resource configurations and process flows that relate to over the air digital pre-distortion measurements. Aspects of the disclosure are further illustrated by and described with reference to apparatus diagrams, system diagrams, and flowcharts that relate to over the air digital pre-distortion measurements.

FIG. 1 illustrates an example of a wireless communications system 100 that supports over the air digital pre-distortion measurements in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may receive from a base station 105 control signaling identifying a measurement configuration for reference signals associated with a power amplifier configuration of the base station 105. The base station 105 may transmit the reference signals to the UE 115 on a set of resources identified by the measurement configuration. The UE 115 may perform one or more non-linear estimation measurements associated with the power amplifier configuration based on the received reference signals and transmit, to the base station, a measurement report based on the one or more non-linear estimation measurements and the measurement configuration.

Figure 2:
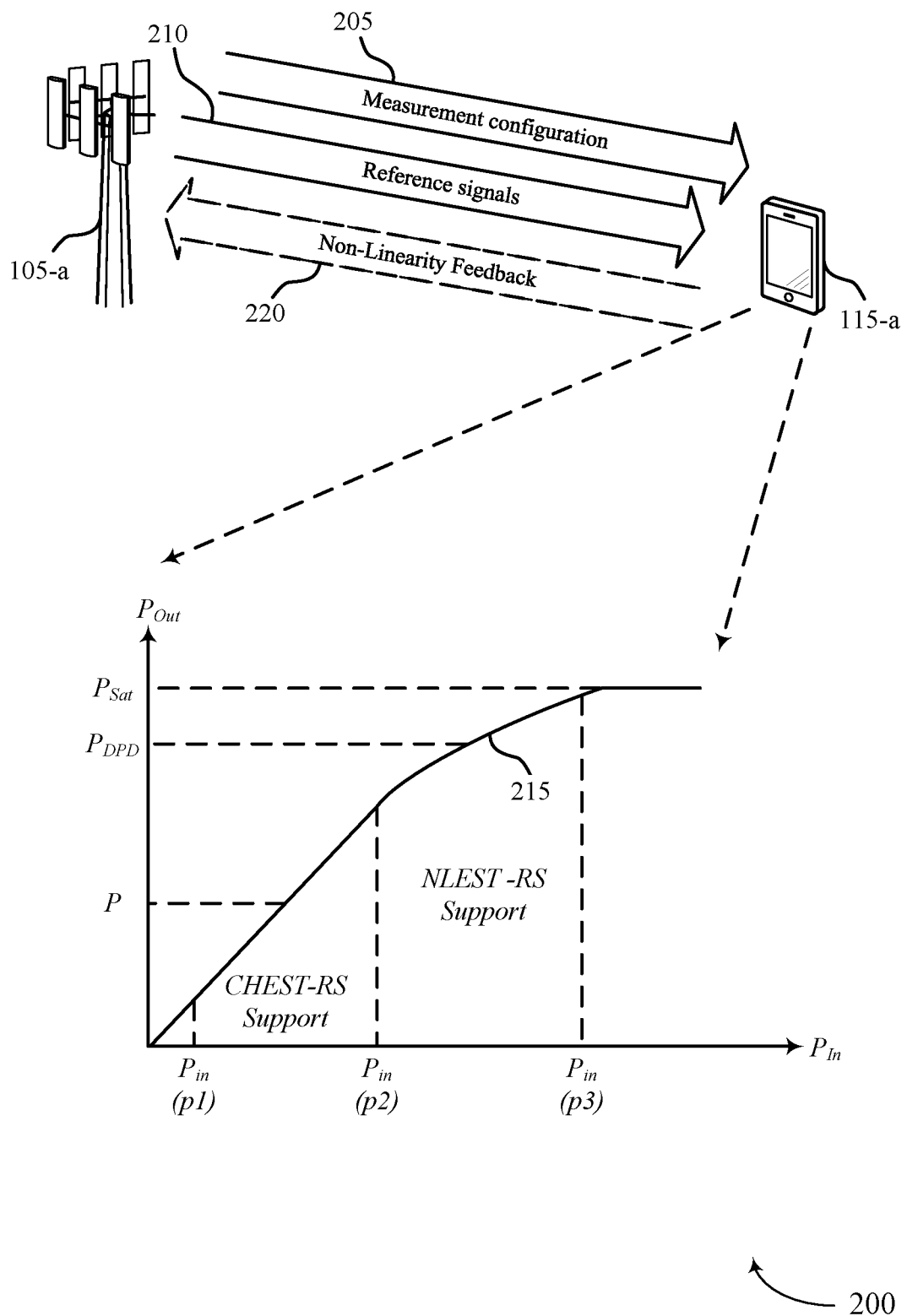
FIG. 2 illustrates an example of a wireless communications system that supports over the air digital pre-distortion measurements in accordance with aspects of the present disclosure.

FIG. 2 illustrates an example of a wireless communications system 200 that supports over the air digital pre-distortion measurements in accordance with aspects of the present disclosure. Wireless communications system 200 may implement aspects or may be implemented by aspects of wireless communications system 100. Wireless communications system 200 may include base station 105-a and/or UE 115-a, which may be examples of the corresponding devices described herein.

Wireless communication systems may use one or more reference signal types, with each reference signal serving one or more purposes. For example, a channel state information reference signal (CSI-RS) may be used for channel state information (CSI) acquisition and beam management, e.g., to measure the downlink channel performance. Demodulation reference signal(s) (DMRS)(s) may be used to support demodulation of the accompanying transmissions (e.g., PDSCH, PUSCH, etc., transmissions). A phase tracking reference signal (PTRS) may be used to track phase and/or frequency within a wireless network, e.g., as phase noise tends to increase at higher operating frequencies. A sounding reference signal (SRS) may be used by a device (e.g., such as UE 115-a) to sound the uplink channel to determine the uplink channel performance characteristics. In some cases, various reference signal design schemes may provide mechanisms that support non-linearity response quantification and/or mitigation for a PA configuration of a transmitting device, such as base station 105-a or UE 115-a. In some cases, base station 105-a may transmit, to UE 115-a, a measurement configuration 205 (e.g., via control signaling) for reference signals associated with a power amplifier configuration of base station 105-a. In some cases, base station 105-a may transmit reference signals 210 to UE 115-a on a set of resources identified by the measurement configuration.

An example PA response 215 (e.g., response curve of a power amplifier) is illustrated in FIG. 2. The PA response 215 is plotted showing the input power ($P_{in}$) to the PA on the horizontal axis and the output power ($P_{out}$) of the PA on the vertical axis. In some cases, the PA response 215 may be linear from p1 to p2, where $P_{out}$ increases linearly with $P_{in}$ from p1 to p2. As shown, the region between p1 and p2 may be generally linear in that increases in the input power to the PA may result in a corresponding (e.g., linear) increase in the output power of the PA. As the input power continues to increase in the region between p2 and p3, the PA response 215 may become nonlinear in that increases in the input power to the PA may result in a corresponding non-linear increase in the output power of the PA until the PA reaches saturation ($P_{Sat}$), where the output power levels out. In some cases, a change in the input power $P_{in}$ between p2 and p3 may correspond to an exponential change in the output power $P_{out}$. Accordingly, the PA configuration of a corresponding transmitting device may include both linear and nonlinear components, with each component impacting, at least to some degree, channel performance, interference, and the like.

Some wireless communication systems may attempt to provide non-linearity response estimation for coverage enhancement in relation to PA configurations. These approaches may involve digital post distortion (DPoD) or DPD, such as OTA-DPD. DPD operation may include signal sensing at an associated radio frequency (RF) circuit. In some cases, the transmitted signal, from one or more PAs (e.g., all PAs) may be received and measured for non-linearity estimation. Because a transmitting device contains non-linear components, such as power amplifiers (PAs) and high-power amplifiers (HPAs) with limited linear dynamic range (DR), the non-linear components may distort the transmitted signal due to a high peak-to-average-power-ratio (PAPR). The non-linear distortions may introduce in-band distortion, which impacts the link performance in terms of mutual information and/or EVM. The non-linear distortions may also introduce out-of-band distortion, which may dictate the amount of ACI. A signal may be transmitted on a first channel. The ACI generally corresponds to how much a second channel adjacent to the first channel is "polluted" by the transmitted signal. To avoid such distortions, power back-off may be introduced, but power back-off has its own limitations. For example, the higher the power back-off the lower the power efficiency for a transmitting device and less power being transmitted on the channel. A complementary method to power back-off is to use digital pre-distortion (DPD) in the transmitter's digital front-end. Using DPD, the amount of distortion may be maintained in some target range, allowing the power back-off to be reduced (e.g., reduced to a selected back-off level, reduced below a back-off threshold, etc.), and thus, PA efficiency is increased or maintained. However, DPD operations typically use signal sensing at the radio frequency (RF) circuit. For example, using DPD with power back-off may include the transmitted signal from all PAs being received and measured for non-linearity estimation.

In some wireless communication systems, a base station may use a relatively high quantity of transmit antenna arrays (e.g., multiple spatial streams, transmission ports, beamforming configurations, antenna ports, etc.). Using DPD with power back-off on base stations includes performing nonlinear estimation relative to each of the transmit antenna arrays, resulting in a relatively high number of feedback links being computed, which may be an impractical number of computations for some base stations (e.g., resulting in a quality of service dropping below a quality threshold).

In OTA-DPD, corrections of a PA non-linear response may occur at base station 105-*a* based on reports from one or more UEs (e.g., UE 115-*a*). In some cases, base station 105-*a* may combine the reports from the multiple UEs (e.g., multiple receivers) to estimate a correction of a PA non-linear response.

The described techniques relate to reference signals 210 utilized for estimation and compensation in relation to the non-linearity response of the transmitting device. The reference signals 210 may include a channel estimation reference signal (CHEST-RS) or a non-linear estimation reference signal (NLEST-RS), or both. Each transmission of a CHEST-RS or an NLEST-RS, or a combination thereof, may be associated with a particular PA configuration of the transmitting device (e.g., base station 105-*a*). In some cases, a PA configuration may correspond to a particular configuration of the RF architecture of the transmitting device. For example, a PA configuration may generally correspond to a particular transmit chain (e.g., one or more oscillators, one or more PAs, one or more filters, one or more switches, etc.), a spatial stream, a particular transmission port, a particular beamforming configuration (e.g., antenna array, beamforming direction, beamforming angle, antenna port, etc.), and the like.

In some examples, the CHEST-RS and/or NLEST-RS may include aspects that are different than aspects of other reference signals transmitted within a wireless communication system (e.g., wireless communications system 200). One difference may include a CHEST-RS or NLEST-RS, or both, may be associated with, or otherwise correspond to, a particular PA configuration of a transmitting device. Another difference may include a CHEST-RS or a NLEST-RS, or both, may not be or may not include precoded signals.

Accordingly, a transmitting device (e.g., base station 105-*a* in this example) may transmit a CHEST-RS to a receiving device (e.g., UE 115-*a* in this example). The CHEST-RS may be associated with a particular PA configuration of base station 105-*a* (e.g., with a particular transmit chain, using a particular PA within a transmit chain, using a particular spatial stream, a particular beamforming configuration, etc.). The UE 115-*a* may receive the CHEST-RS and measure, identify, or otherwise determine a channel estimation measurement associated with the PA configuration based on the CHEST-RS. In some cases, the CHEST-RS may correspond to the linear portion of PA response 215 and be used to quantify the channel performance between the transmitting device and the receiving device. Accordingly, the CHEST-RS may support channel performance estimation or mitigation for the portion of PA response 215 extending between p1 and p2. In some examples, the CHEST-RS may be transmitted over a frequency band (e.g., a full bandwidth) used for communications between base station 105-*a* and UE 115-*a*.

In some examples, the transmitting device may transmit a NLEST-RS over a subset of the frequency band (e.g., over a smaller bandwidth) used for communications between the transmitting device and the receiving device. In some cases, the NLEST-RS may be associated with the same PA configuration that the CHEST-RS is associated with. UE 115-*a* may measure, identify, or otherwise determine a non-linear estimation measurement associated with the PA configuration based on the NLEST-RS and the CHEST-RS. For example, UE 115-*a* may measure the signal strength over time of the NLEST-RS and/or CHEST-RS to determine the channel estimation measurement and the non-linear estimation measurement. Broadly, the non-linear estimation measurement may generally identify or correspond to the non-linear response of the PA configuration. For example, the non-linear estimation measurement may identify the non-linear response portion of PA response 215 extending between the p2 and p3.

In the illustrated example, UE 115-*a* may transmit a measurement report 220 (e.g., non-linearity feedback, a message based on feedback measurements, a non-linear response feedback message, etc.) to base station 105-*a*. In some cases, the measurement report 220 may identify or otherwise indicate a channel estimation measurement as well as a non-linear estimation measurement. In some cases, measurement report 220 may identify the channel estimation measurement and/or the non-linear estimation measurement corresponding to PA response 215 of base station 105-*a*. In some cases, base station 105-*a* and UE 115-*a* may perform wireless communications based on the channel estimation measurement and the non-linear response of the PA configuration of base station 105-*a*. In some cases, base station 105-*a* and/or UE 115-*a* may use DPoD and/or OTA-DPD techniques discussed herein according to the measurement report 220 to quantify and/or mitigate distortion or interference caused by a transmission from base station 105-*a* (in this example) using that PA configuration.

In some examples, the CHEST-RS and/or NLEST-RS may have various resource configurations, which may be preconfigured or preset, and/or may be configured by base station 105-*a* using a signal (e.g., a higher layer signal, RRC signaling, MAC CE, DCI, etc. and/or a new signal). In some cases, resource configurations for the CHEST-RS and/or NLEST-RS may identify various resources, configurations, etc., associated with the CHEST-RS and/or NLEST-RS transmissions. The resources for CHEST-RS and NLEST-RS may be the same or may be different resource (e.g., in terms of time, frequency, subcarriers, bandwidth, slots, etc.). UE 115-*a* may use the resource configurations when receiving the CHEST-RS and/or NLEST-RS according to the resource configurations, e.g., repetition patterns (e.g., periodic, aperiodic, semi-persistent), antenna configurations, timing, etc. Aspects of features of the various resource configurations for the CHEST-RS and/or NLEST-RS are discussed further herein.

In some examples, aspects of the described techniques provide for base station 105-*a* (e.g., the transmitting device) to transmit or otherwise convey CHEST-RS or NLEST-RS, or both, to UE 115-*a* (e.g., the receiving device) to use for channel estimation measurements and/or non-linear estimation measurements. Base station 105-*a* or UE 115-*a*, or both, may use these measurements to identify, quantify, or otherwise fine tune an estimation of the PA response 215 of base station 105-*a*.

In some cases, aspects of the described techniques provide for base station 105-*a* or UE 115-*a*, or both, calculating DPD coefficients (e.g., coefficient of a digital pre-distortion model). In some cases, aspects of the described techniques provide for base station 105-*a* and UE 115-*a* to define and use measurements to periodically verify that DPD coefficients have not aged (e.g., determine whether DPC coefficients have expired based on a set time period of the DPD coefficients expiring from the time they are calculated or from the time they are implemented, etc.). In some examples, aspects of the described techniques provide for base station 105-*a* and UE 115-*a* to define and use measurements to verify a training process associated with a DPD model (e.g., determine a training of a DPD model satisfies an accuracy threshold). In some cases, aspects of the described techniques provide for base station 105-*a* and UE 115-*a* to define and use measurements to quantify a DPD gain (e.g., determine whether a DPD gain satisfies a gain threshold).

In some examples, UE 115-*a* may occasionally monitor (e.g., periodically, or aperiodically, or semi persistently, or any combination thereof) one or more base station characteristics (e.g., feedback measurements) related to DPD model quality, which may include EVM measurements, or adjacent channel leakage power ratio (ACLR) measurements, or received power measurements, or ratio of nonlinear kernel energy to linear kernel energy measurements, or MSE of a weighted least squares of DPD estimation measurements, or a subset of kernels which optimize the DPD operation, or any combination thereof. In some cases, base station 105-*a* and UE 115-*a* may choose a subset of kernels from a group of kernels configured to model a given PA. In some cases, base station 105-*a* may transmit a group of kernels to UE 115-*a* (e.g., in a configuration message). In some cases, the UE 115-*a* may select a subset of kernels to use out of the group of kernels and may transmit the selected subset of kernels to the base station to indicate which kernels result in the best DPD gain (e.g., best EVM, best ACI, best ACLR, best received power, etc.). Based on the metrics reported by at least UE 115-*a* (e.g., from multiple UEs), base station 105-*a* may modify the transmission characteristics, or schedule additional DPD training session, or adjust a power supply of a given PA, or adjust an output transmission power of the given PA, modify attributes of the DPD model, make further calculations on DPD coefficients (e.g., based on coefficients calculated by UE 115-*a*), or any combination thereof.

In some examples, base station 105-*a* may send UE 115-*a* an expected target performance of the DPD model (e.g., expected EVM, expected ACI, expected ACLR, expected received power, etc.). UE 115-*a* may perform measurements in relation to the DPD model and the expected target performance, and determine whether the measurements indicate that the DPD model meets the expected target performance. In some cases, UE 115-*a* may respond to base station 105-*a* with a performance indication (e.g., a binary value). In some cases, a first binary bit value (e.g., binary 1 or binary 0) may indicate the DPD model performs within an expected range or satisfies a performance threshold, while a second binary bit value (e.g., binary 0 or binary 1) may indicate the DPD model does not perform within the expected range or fails to satisfy the performance threshold.

The present techniques may reduce power consumption and free up processing cycles of one or more devices (e.g., battery-operated devices, UE 115-*a*, a UE 115 of FIG. 1, etc.) by performing over the air digital pre-distortion measurements that decrease the number of feedback measurements and computational costs of the feedback measurements by shifting computation from base station 105-*a* to UE 115-*a*. Additionally, the described operations of UE 115-*a* verify a quality of a DPD training process and determine an age of DPD coefficients while maintaining a performance level of the base station 105-*a* (e.g., maintaining a power efficiency of power available to a given channel). Additionally, the described operations of UE 115-*a* decrease of in-band distortion and spectral re-growth, which results in adjacent channel interference being reduced and the bit error rate (BER) performance being maintained. Additionally, described techniques may result in avoiding multiple retransmissions and failed transmissions, decreasing system latency, improving signal quality, and improving user experience.

Figure 3:
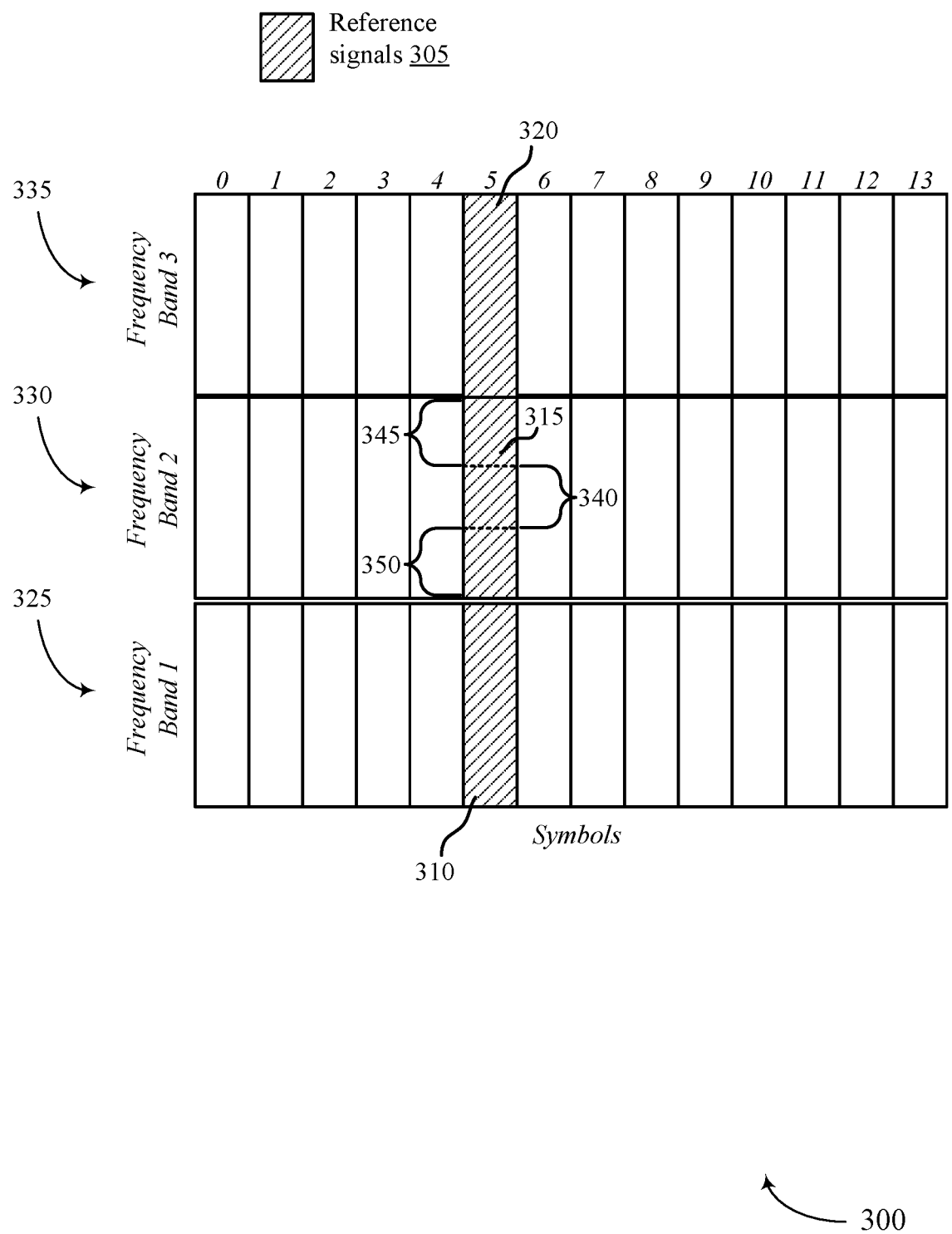
FIG. 3 illustrates an example of a resource configuration that supports over the air digital pre-distortion measurements in accordance with aspects of the present disclosure.

FIG. 3 illustrates an example of a resource configuration 300 that supports over the air digital pre-distortion measurements in accordance with aspects of the present disclosure. Resource configuration 300 may implement aspects of or may be implemented by aspects of wireless communications systems 100 and/or 200. Aspects of resource configuration 300 may be implemented by a base station and/or UE, which may be examples of the corresponding devices described herein. The base station and UE may be configured as a transmitting device and receiving device, respectively, or vice versa.

In the illustrated example, resource configuration 300 may provide configuration in relation to reference signals 305. In some examples, each reference signal transmission of the transmitting device (e.g., including reference signals 305) may be associated with a PA configuration (e.g., a PA configuration for each transmit antenna of a transmit antenna array of the transmitting device). The PA configuration may indicate a transmit chain, or a spatial stream, or beamforming direction and/or configuration, or PA and/or oscillator(s) within the transmit chain, or any combination thereof. In some cases, the UE may receive the reference signals 305 transmitted over one or more frequency bands (e.g., over the full bandwidth or part of the full bandwidth being used for communications between the base station and the UE). The UE may measure, identify, or otherwise determine a channel estimation measurement associated with the PA configuration based on measurements performed by the UE on the reference signals 305. For example, the UE may measure EVM, ACI, ACLR, received power, etc., in relation to the reference signals 305. In some cases, the UE may measure values over time or take instantaneous measurements, or both.

In some examples, the UE may measure, identify, or otherwise determine a non-linear estimation measurement associated with the PA configuration based on the reference signals 305. The nonlinear estimation measurement may generally identify or otherwise correspond to a nonlinear response of the PA configuration of the base station. The UE may provide a measurement report (e.g., feedback information) associated with the channel estimation measurement and/or the non-linear estimation measurement to the base station. The base station may use the measurement report to mitigate or eliminate distortion or interference into the channel resulting from the PA configuration non-linearity. Accordingly, the base station and UE may perform wireless communications based on the channel estimation measurement and the non-linear response of the PA configuration.

In some examples, the base station may configure the UE with the resource configuration for the reference signals 305. In some cases, the resource configuration may identify aspects of the time, frequency, spatial, code, etc., resources or other parameters associated with a corresponding reference signal. In some cases, reference signals 305 may include a non-linear estimation reference signal or a channel estimation reference signal, or both. In some cases, non-linear estimation reference signals may be transmitted in a first symbol (e.g., symbol 5), while channel estimation reference signals may be transmitted in a second symbol (e.g., symbol 4 or symbol 6). In some cases, the resource configuration may broadly identify the spatial allocation (e.g., number of antenna ports/precoding), the frequency allocation (e.g., the PRB density, number of channel reference signal PRBs, number of non-linear reference signal PRBs), the time allocation (e.g., number of channel reference signal symbols/repetition, number of non-linear reference signal symbols/repetition), and the like, for the transmissions of the reference signals 305. The base station may use higher layer signaling, RRC signaling, a MAC-CE, DCI, and/or other signaling techniques to configure the resource configuration for the UE.

In the illustrated example, the resource configuration 300 configured by the base station may include reference signals 305 transmitted during a single symbol (e.g., symbol 5 in the provided example). In some cases, the reference signals 305 may be transmitted using a full frequency band (e.g., spread over the whole UE allocated bandwidth) or a portion of the full frequency band. In some cases, the reference signals 305 may be transmitted using a subset of the frequency band (e.g. spread over a limited bandwidth to avoid or mitigate a high ACLR).

In some examples, at least a portion of reference signals 305 (e.g., non-linear estimation reference signals) may be configured for training of a DPD model. In some cases, the UE may know one or more aspects of the reference signals 305 before the UE receives reference signals 305 (e.g., reference signals 305 are known signals).

In some examples, reference signals 305 may include DMRS. In some cases, the DMRS may be associated with inter-carrier measurements. In some cases, the DMRS may include an already-configured DMRS of an associated PDSCH. In some examples, a transmission of reference signals 305 (e.g., configured as DMRS) may be de-boosted (e.g., may not be amplified for transmission at some transmit power level) so that the reference signals 305 resides in the PA linear region (e.g., region of FIG. 2 between p1 and p2).

In some examples, the base station may allocate multiple carriers to carry reference signals 305 (e.g., inter-carrier measurement configuration). In the illustrated example, the base station may allocate three carriers to carry reference signals 305 (e.g., configured as DMRS). In some cases, the base station may transmit control signaling that indicates a measurement configuration. In some cases, the measurement configuration may indicate the three carriers or frequency bands associated with each reference signal of reference signals 305. As shown, a first reference signal 310 of reference signals 305 may be allocated to a first frequency band 325, a second reference signal 315 of reference signals 305 may be allocated to a second frequency band 330, a third reference signal 320 of reference signals 305 may be allocated to a third frequency band 335.

In some examples, the first reference signal 310 may be associated with a first adjacent carrier, the third reference signal 320 may be associated with a second adjacent carrier, and the second reference signal 315 may be associated with a middle carrier between the first adjacent carrier and the second adjacent carrier. In some cases, the base station may transmit a known reference signal (e.g., the second reference signal 315) on the middle carrier, while the UE makes feedback measurements (e.g., ACI, ACLR, EVM, etc.) on the adjacent carriers. In some cases, the measurement configuration may indicate the UE is to make feedback measurements over a frequency range of first frequency band 325, or over a frequency range of third frequency band 335, or both. Accordingly, the UE may determine the non-linear distortions and interference of adjacent channels (e.g., adjacent carriers) caused by the signal transmitted over the second frequency band 330 (e.g., middle carrier).

In some examples, reference signals 305 may include non-linear estimation reference signals (NLRS). In some cases, the NLRS may be associated with intra-carrier measurements. In some examples, the base station may allocate one carrier to carry reference signals 305 (e.g., intra-carrier measurement configuration). In the illustrated example, the base station may allocate one carrier to carry reference signals 305 (e.g., configured as NLRS). In some cases, the measurement configuration may indicate the one carrier or frequency band associated with reference signals 305 (e.g., configured as NLRS). In some cases, the measurement configuration may indicate a first adjacent frequency region 345 and second adjacent frequency region 350 of second frequency band 330, as well as a middle frequency region 340 of second frequency band 330 that is allocated between the first adjacent frequency region 345 and the second adjacent frequency region 350. In some cases, the measurement configuration may indicate that middle frequency region 340 may carry the known reference signal (e.g., a NLRS of reference signals 305), and that measurements are to be performed on the first adjacent frequency region 345 and the second adjacent frequency region 350. Thus, while the UE receives the known reference signal on middle frequency region 340, the UE may perform measurements on first adjacent frequency region 345 and second adjacent frequency region 350 to determine the effects of the known reference signal on these adjacent frequency regions.

In some cases, the non-linear estimation reference signal may be boosted (e.g., amplified at least some degree) so that the reference signals 305 resides in the PA non-linear region (e.g., region of FIG. 2 between p2 and p3). In some cases, the UE may or may not be aware of whether or not the reference signals are boosted or de-boosted (e.g., measurement configuration may or may not indicate whether the reference signals are boosted or de-boosted). In some cases, the base station may increase the bandwidth and/or power according to a configuration table. In some cases, the resource configuration may indicate that the channel estimation reference signal and/or the non-linear estimation reference signal are transmitted with repetition or without repetition.

In some examples, reference signals 305 (e.g., configured as NLRS) may be configured with the same level of power as one or more other symbols of resource configuration 300, which may enable the UE to make measurements on the reference signals 305 with a signal configured for DPD measurements. In some cases, reference signals 305 (e.g., configured as NLRS) may be configured with a relatively narrow frequency allocation. In some cases, when reference signals 305 are configured as NLRS, the base station may null one or more adjacent frequency regions.

In some examples, the base station may signal the frequency regions of reference signals 305 (e.g., configured for DMRS or NLRS) in one or more control messages (e.g., control signaling). In some cases, the control message may indicate the bandwidth allocated for the PDSCH that includes the DMRS, or the PDSCH that includes the NLRS, or the pilot signal within the PDSCH. In some cases, the control message may include a downlink control information (DCI) message, or radio resource control (RRC) message, or media access control (MAC) control element (CE), or any combination thereof.

In some examples, the UE may be configured (e.g., configured based on one or more configuration messages, pre-configured by the base station, etc.) with the frequency regions of the carriers associated with measurements (e.g., inter-carrier measurements via DMRS, intra-carrier measurements via NLRS, etc.). In some cases, the base station may transmit a control message to the UE to indicate measurements to be performed by the UE and indicate the resources that the UE may use to perform the measurements (e.g., multiple carriers for inter-carrier measurements via DMRS, one carrier for intra-carrier measurements via NLRS, the frequency ranges of the one or more carriers, etc.). The base station may indicate whether the UE is to perform measurements based on reference signals 305 configured with NLRS or reference signals 305 configured with PDSCH DMRS.

Figure 4:
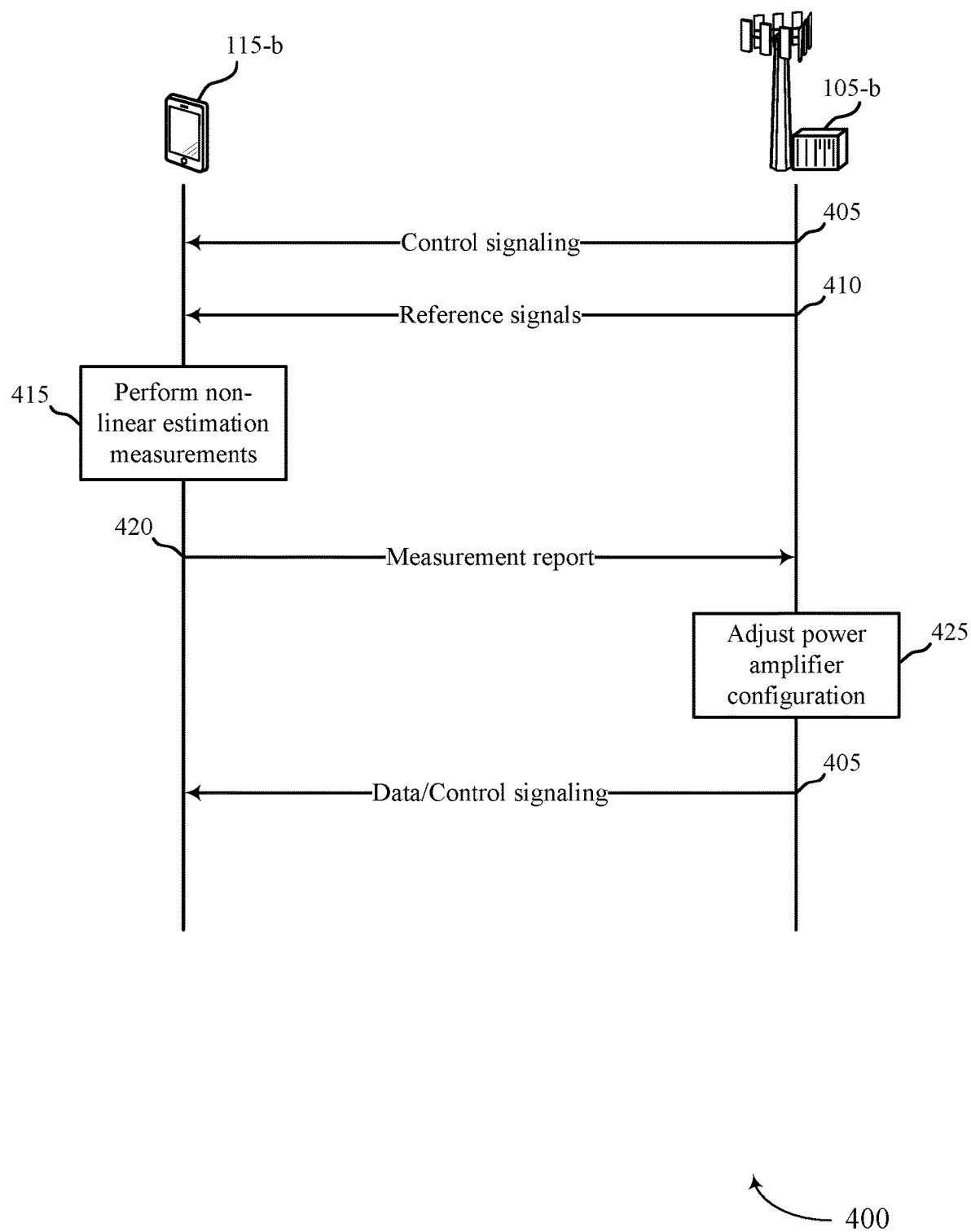
FIG. 4 illustrates an example of a process flow that supports over the air digital pre-distortion measurements in accordance with aspects of the present disclosure.

FIG. 4 illustrates an example of a process flow 400 that supports over the air digital pre-distortion measurements in accordance with aspects of the present disclosure.

At 405, base station 105-b transmits, to UE 115-b, control signaling that identifies a measurement configuration for reference signals associated with a power amplifier configuration of base station 105-b. In some cases, the power amplifier configuration may be associated with at least one transmit antenna of base station 105-b or at least one power amplifier of a transmit antenna of base station 105-b.

At 410, base station 105-b transmits the reference signals on a set of resources identified by the measurement configuration. In some cases, the reference signals may be associated with multiple carriers for inter-carrier measurements via DMRS. In some cases, the reference signals may be associated with one carrier for intra-carrier measurements via NLRS. In some cases, the measurement configuration may indicate the frequency ranges of the one or more carriers.

At 415, UE 115-b performs one or more non-linear estimation measurements associated with the power amplifier configuration based on the received reference signals. In some cases, the one or more non-linear estimation measurements may include EVM measurements, or ACLR measurements, or received power measurements, or ratio of nonlinear kernel energy to linear kernel energy measurements, or MSE of a weighted least squares of DPD estimation measurements, or a subset of kernels which optimize the DPD operation, or any combination thereof.

At 420, UE 115-b transmits a measurement report to base station 105-b. In some cases, the measurement report may indicate the one or more non-linear estimation measurements performed by UE 115-b according to the measurement configuration.

At 425, base station 105-b adjusts the configuration of a power amplifier of base station 105-b according to the measurement report that base station 105-b receives from UE 115-b. In some cases, base station 105-b may adjust the configuration of the power amplifier so that the power amplifier operates within the linear portion of its operating curve.

At 430, base station 105-b transmits signals to UE 115-b (e.g., data messages, control information, etc.) according to the adjusted configuration of the power amplifier.

Figure 5:
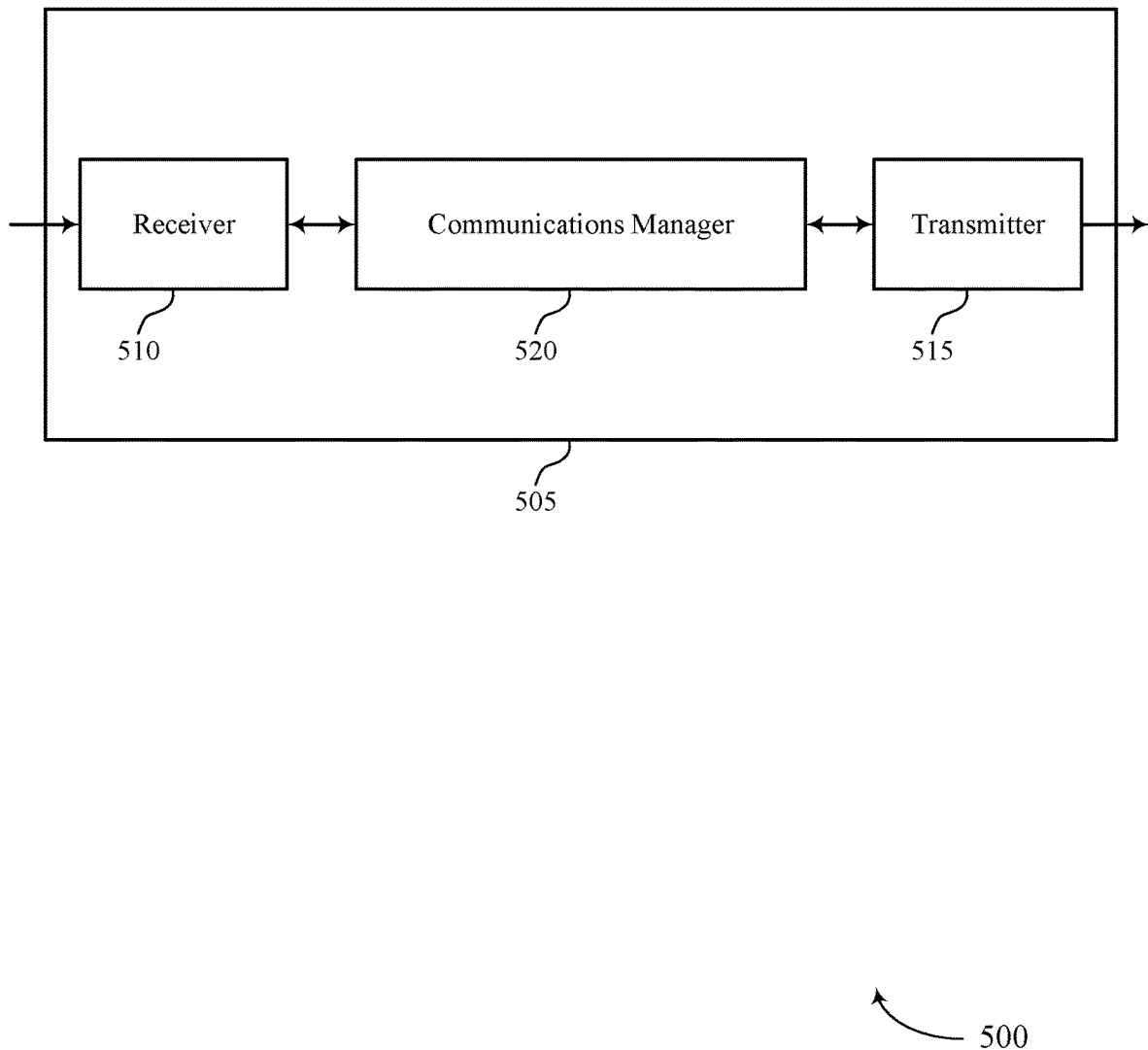
FIGS. 5 and 6 show block diagrams of devices that support over the air digital pre-distortion measurements in accordance with aspects of the present disclosure.

FIG. 5 shows a block diagram 500 of a device 505 that supports over the air digital pre-distortion measurements in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to over the air digital pre-distortion measurements). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to over the air digital pre-distortion measurements). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of over the air digital pre-distortion measurements as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving, from a base station, control signaling identifying a measurement configuration for one or more non-linear estimation measurements of reference signals associated with a power amplifier configuration of the base station. The communications manager 520 may be configured as or otherwise support a means for receiving, from the base station, the reference signals on a set of resources identified by the measurement configuration. The communications manager 520 may be configured as or otherwise support a means for performing one or more non-linear estimation measurements associated with the power amplifier configuration of the base station based on the received reference signals. The communications manager 520 may be configured as or otherwise support a means for transmitting, to the base station according to the measurement configuration, a measurement report based on the one or more non-linear estimation measurements.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for increasing system efficiency based on device 505 performing over the air digital pre-distortion measurements that decrease the number of feedback measurements and computational costs of the feedback measurements (e.g., by shifting computation from a base station to a UE). Additionally, the described operations verify a quality of a DPD training process and determine an age of DPD coefficients while maintaining a performance level of the base station (e.g., maintaining a power efficiency of power available to a given channel). Additionally, the described operations decrease in-band distortion and spectral re-growth, which results in adjacent channel interference being maintained or reduced and bit error rate (BER) performance being maintained or reduced. Additionally, described techniques may result in avoiding multiple retransmissions and failed transmissions, decreasing system latency, improving signal quality, and improving user experience, reduced processing, reduced power consumption, more efficient utilization of communication resources.

Figure 6:
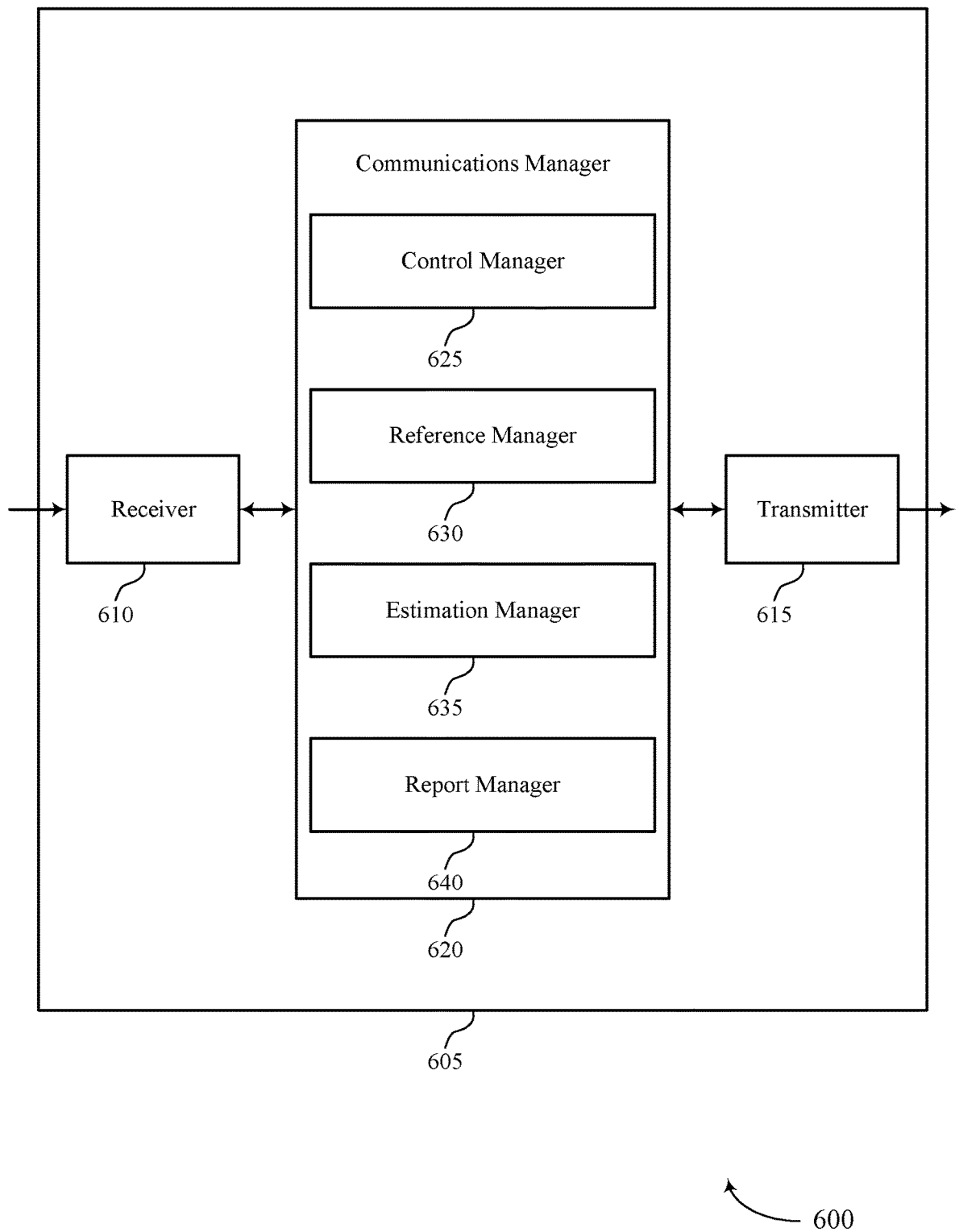

FIG. 6 shows a block diagram 600 of a device 605 that supports over the air digital pre-distortion measurements in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to over the air digital pre-distortion measurements). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to over the air digital pre-distortion measurements). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of over the air digital pre-distortion measurements as described herein. For example, the communications manager 620 may include a control manager 625, a reference manager 630, an estimation manager 635, a report manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The control manager 625 may be configured as or otherwise support a means for receiving, from a base station, control signaling identifying a measurement configuration for one or more non-linear estimation measurements of reference signals associated with a power amplifier configuration of the base station. The reference manager 630 may be configured as or otherwise support a means for receiving, from the base station, the reference signals on a set of resources identified by the measurement configuration. The estimation manager 635 may be configured as or otherwise support a means for performing one or more non-linear estimation measurements associated with the power amplifier configuration of the base station based on the received reference signals. The report manager 640 may be configured as or otherwise support a means for transmitting, to the base station according to the measurement configuration, a measurement report based on the one or more non-linear estimation measurements.

Figure 7:
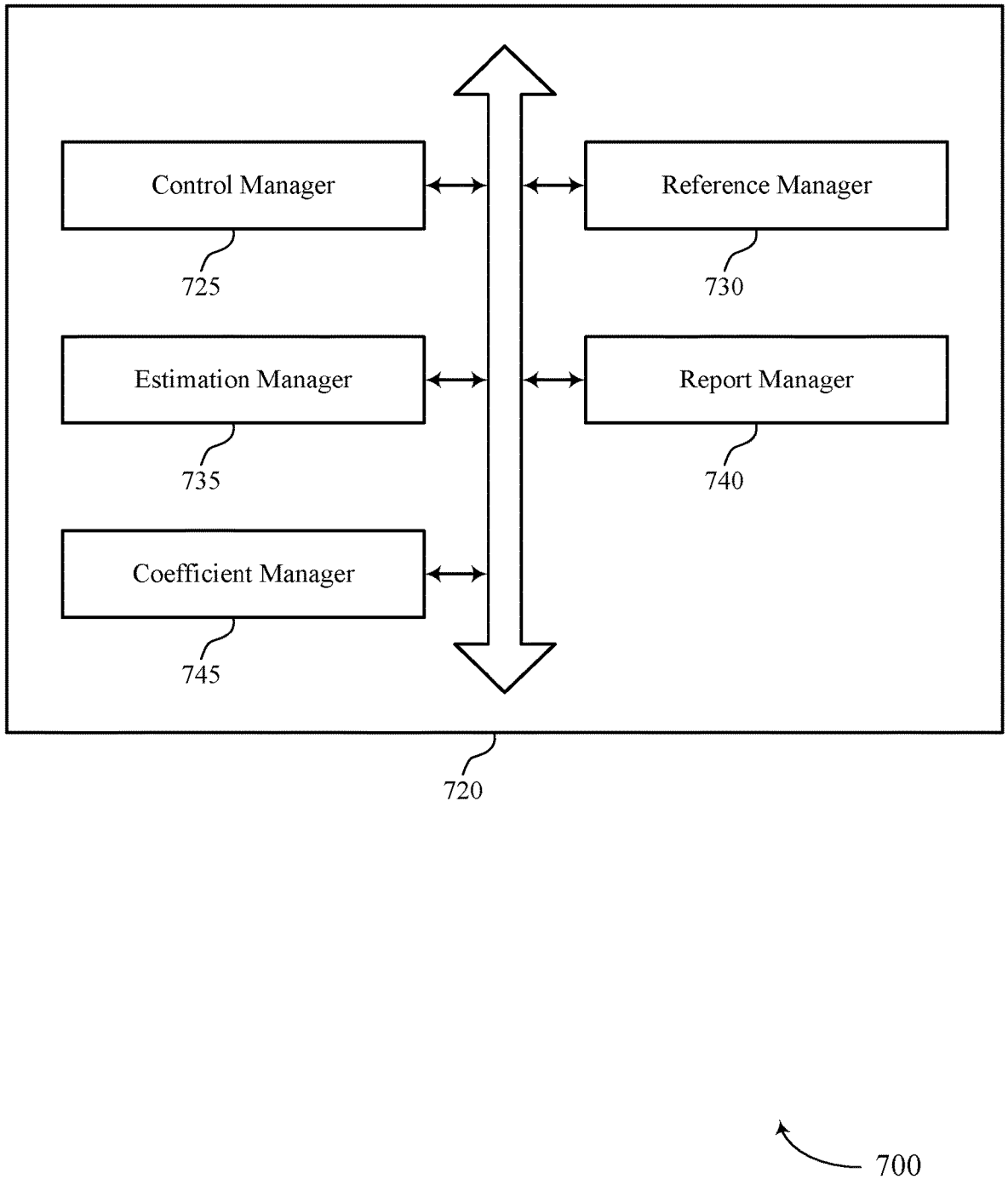
FIG. 7 shows a block diagram of a communications manager that supports over the air digital pre-distortion measurements in accordance with aspects of the present disclosure.

FIG. 7 shows a block diagram 700 of a communications manager 720 that supports over the air digital pre-distortion measurements in accordance with aspects of the present disclosure. The communications manager 720 may be an example of aspects of a communications manager 520, a communications manager 620, or both, as described herein. The communications manager 720, or various components thereof, may be an example of means for performing various aspects of over the air digital pre-distortion measurements as described herein. For example, the communications manager 720 may include a control manager 725, a reference manager 730, an estimation manager 735, a report manager 740, a coefficient manager 745, or any combination thereof. Each of these components may communicate, directly or indirectly, with one another (e.g., via one or more buses).

The communications manager 720 may support wireless communication at a UE in accordance with examples as disclosed herein. The control manager 725 may be configured as or otherwise support a means for receiving, from a base station, control signaling identifying a measurement configuration for one or more non-linear estimation measurements of reference signals associated with a power amplifier configuration of the base station. The reference manager 730 may be configured as or otherwise support a means for receiving, from the base station, the reference signals on a set of resources identified by the measurement configuration. The estimation manager 735 may be configured as or otherwise support a means for performing one or more non-linear estimation measurements associated with the power amplifier configuration of the base station based on the received reference signals. The report manager 740 may be configured as or otherwise support a means for transmitting, to the base station according to the measurement configuration, a measurement report based on the one or more non-linear estimation measurements.

In some examples, to support receiving the reference signals, the reference manager 730 may be configured as or otherwise support a means for receiving a non-linear estimation reference signal on resources identified by the measurement configuration, the one or more non-linear estimation measurements performed on the non-linear estimation reference signal.

In some examples, the UE is configured to communicate data signals on a first carrier and, to support receiving the control signaling identifying the measurement configuration, the reference manager 730 may be configured as or otherwise support a means for receiving the control signaling identifying the measurement configuration, where the measurement configuration indicates that the set of resources on which the reference signals are to be transmitted include at least a second carrier adjacent the first carrier and a third carrier adjacent the first carrier.

In some examples, the reference manager 730 may be configured as or otherwise support a means for performing one or more adjacent channel leakage ratio measurements on the reference signals on the second carrier, or the third carrier, or any combination thereof, the measurement configuration indicating for the UE to perform the one or more adjacent channel leakage ratio measurements.

In some examples, the UE is configured to communicate data signals on a carrier and, to support receiving the control signaling identifying the measurement configuration, the control manager 725 may be configured as or otherwise support a means for receiving the control signaling identifying the measurement configuration, where the measurement configuration indicates a first frequency region of the carrier, a second frequency region of the carrier, and a third frequency region of the carrier that has a frequency range between the first frequency region and the second frequency region, where the set of resources on which the reference signals are to be transmitted include the third frequency region, and the one or more non-linear estimation measurements are performed on the reference signals received in the third frequency region of the carrier.

In some examples, the coefficient manager 745 may be configured as or otherwise support a means for generating at least one coefficient of a digital pre-distortion model based on the received reference signals. In some examples, the coefficient manager 745 may be configured as or otherwise support a means for transmitting an indication of the generated at least one coefficient to the base station. In some examples, reference signals described herein may include demodulation reference signals.

In some examples, the coefficient manager 745 may be configured as or otherwise support a means for determining whether an age of a coefficient of a digital pre-distortion model satisfies an age threshold, where the measurement report indicates whether the age of the coefficient satisfies the age threshold.

In some examples, to support performing the one or more non-linear estimation measurements, the control manager 725 may be configured as or otherwise support a means for determining whether the one or more non-linear estimation measurements satisfy the performance threshold for the digital pre-distortion model. In some examples, to support performing the one or more non-linear estimation measurements, the control manager 725 may be configured as or otherwise support a means for transmitting, to the base station, an indication of whether the one or more non-linear estimation measurements satisfy the performance threshold.

In some examples, the measurement report includes a 1-bit value indicating whether the one or more non-linear estimation measurements satisfy the performance threshold, the indication including the 1-bit value.

In some examples, to support performing the one or more non-linear estimation measurements, the estimation manager 735 may be configured as or otherwise support a means for performing the one or more non-linear estimation measurements to determine an error vector magnitude, an adjacent channel leakage power ratio, a received power, a ratio of nonlinear kernel energy to linear kernel energy, a mean square error of a weighted least squares of a digital pre-distortion estimation, a subset of kernels associated with a digital pre-distortion model, or any combination thereof.

Figure 8:
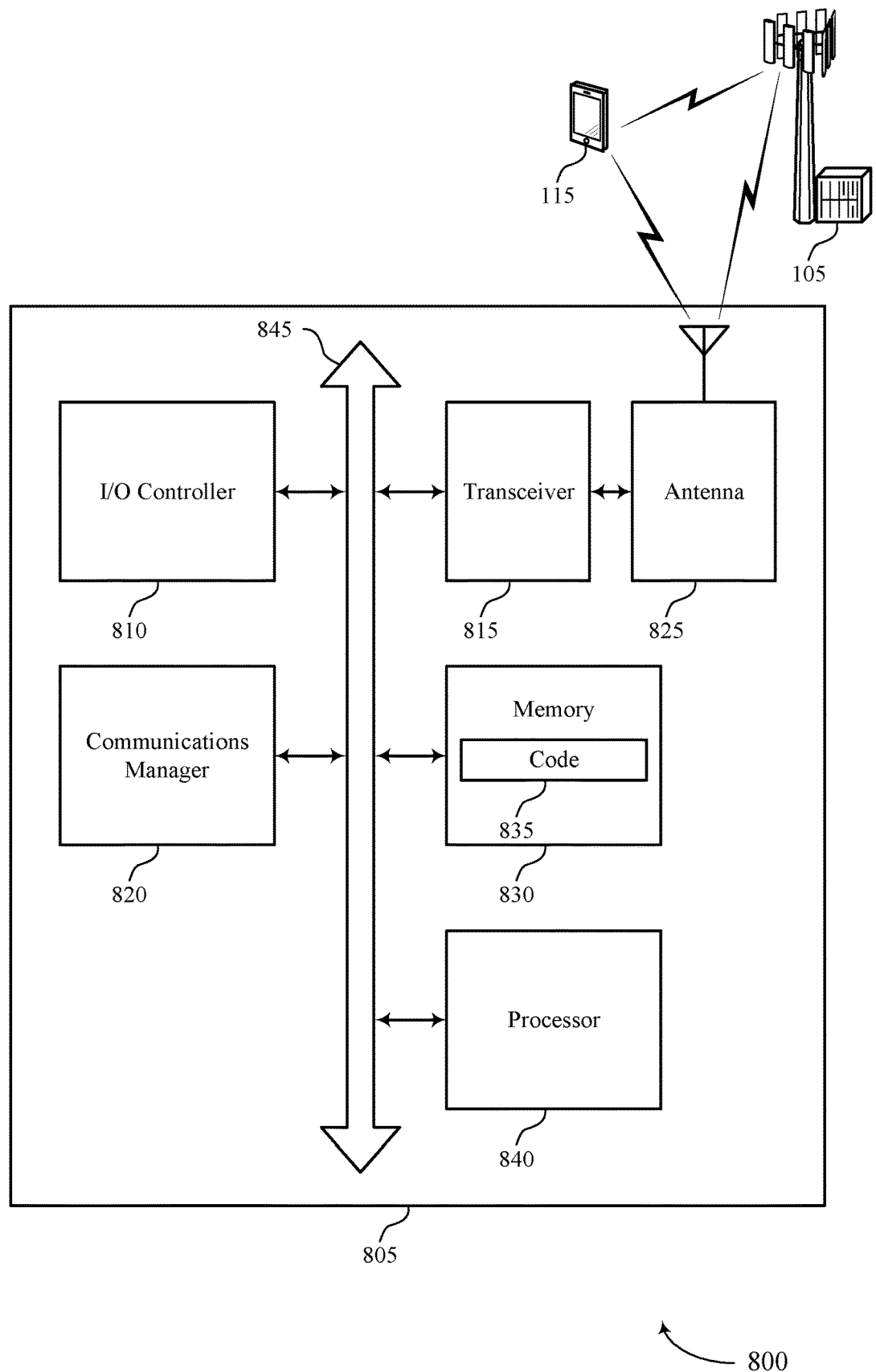
FIG. 8 shows a diagram of a system including a device that supports over the air digital pre-distortion measurements in accordance with aspects of the present disclosure.

FIG. 8 shows a diagram of a system 800 including a device 805 that supports over the air digital pre-distortion measurements in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting over the air digital pre-distortion measurements). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving, from a base station, control signaling identifying a measurement configuration for one or more non-linear estimation measurements of reference signals associated with a power amplifier configuration of the base station. The communications manager 820 may be configured as or otherwise support a means for receiving, from the base station, the reference signals on a set of resources identified by the measurement configuration. The communications manager 820 may be configured as or otherwise support a means for performing one or more non-linear estimation measurements associated with the power amplifier configuration of the base station based on the received reference signals. The communications manager 820 may be configured as or otherwise support a means for transmitting, to the base station according to the measurement configuration, a measurement report based on the one or more non-linear estimation measurements.

By including or configuring the communications manager 820 in accordance with examples as described herein, the device 805 may support techniques for increasing system efficiency such that device 805 may perform over the air digital pre-distortion measurements that decrease the number of feedback measurements and computational costs of the feedback measurements (e.g., by shifting computation from a base station to a UE). Additionally, the described operations verify a quality of a DPD training process and determine an age of DPD coefficients while maintaining a performance level of the base station (e.g., maintaining a power efficiency of power available to a given channel). Additionally, the described operations decrease in-band distortion and spectral re-growth, which results in adjacent channel interference being maintained or reduced and bit error rate (BER) performance being maintained or reduced. Additionally, described techniques may result in improved communication reliability, reduced latency, improved user experience related to reduced processing, reduced power consumption, more efficient utilization of communication resources, improved coordination between devices, longer battery life, improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of over the air digital pre-distortion measurements as described herein, or the processor 840 and the memory 830 may be otherwise configured to perform or support such operations.

Figure 9:
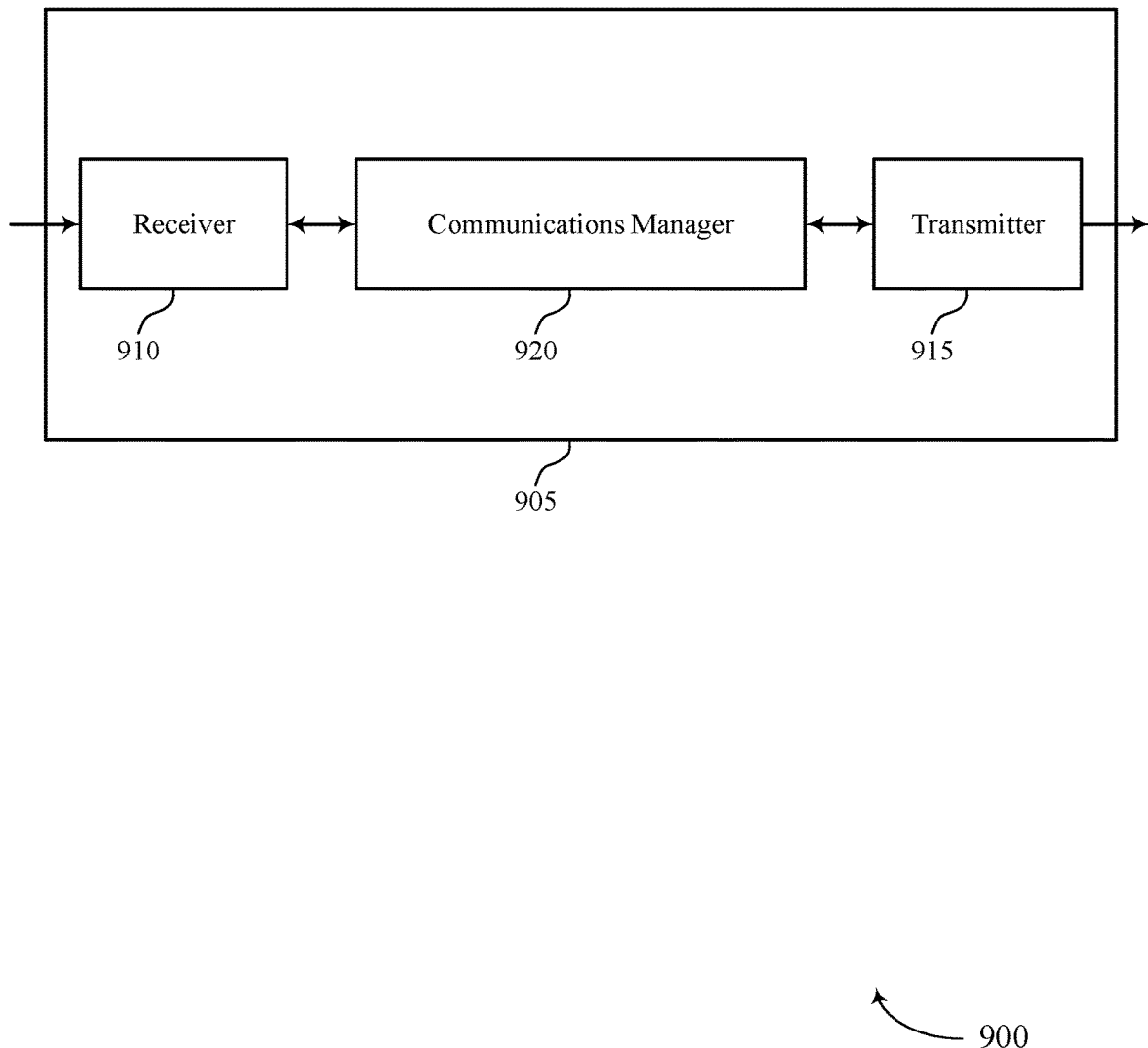
FIGS. 9 and 10 show block diagrams of devices that support over the air digital pre-distortion measurements in accordance with aspects of the present disclosure.

FIG. 9 shows a block diagram 900 of a device 905 that supports over the air digital pre-distortion measurements in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to over the air digital pre-distortion measurements). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to over the air digital pre-distortion measurements). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of over the air digital pre-distortion measurements as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting, to a UE, control signaling identifying a measurement configuration for one or more non-linear estimation measurements of reference signals associated with a power amplifier configuration of the base station. The communications manager 920 may be configured as or otherwise support a means for transmitting the reference signals on a set of resources identified by the measurement configuration. The communications manager 920 may be configured as or otherwise support a means for receiving, from the UE, a measurement report indicating one or more non-linear estimation measurements of reference signals performed associated with the power amplifier configuration of the base station by the UE according to the measurement configuration. The communications manager 920 may be configured as or otherwise support a means for adjusting the power amplifier configuration of the base station based on the received measurement report. The communications manager 920 may be configured as or otherwise support a means for transmitting signals to the UE using the adjusted power amplifier configuration.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for increasing system efficiency such that device 905 may perform over the air digital pre-distortion measurements that decrease the number of feedback measurements and computational costs of the feedback measurements (e.g., by shifting computation from a base station to a UE). Additionally, the described operations verify a quality of a DPD training process and determine an age of DPD coefficients while maintaining a performance level of the base station (e.g., maintaining a power efficiency of power available to a given channel). Additionally, the described operations decrease in-band distortion and spectral re-growth, which results in adjacent channel interference being maintained or reduced and bit error rate (BER) performance being maintained or reduced. Additionally, described techniques may result in reduced processing, reduced power consumption, more efficient utilization of communication resources.

Figure 10:
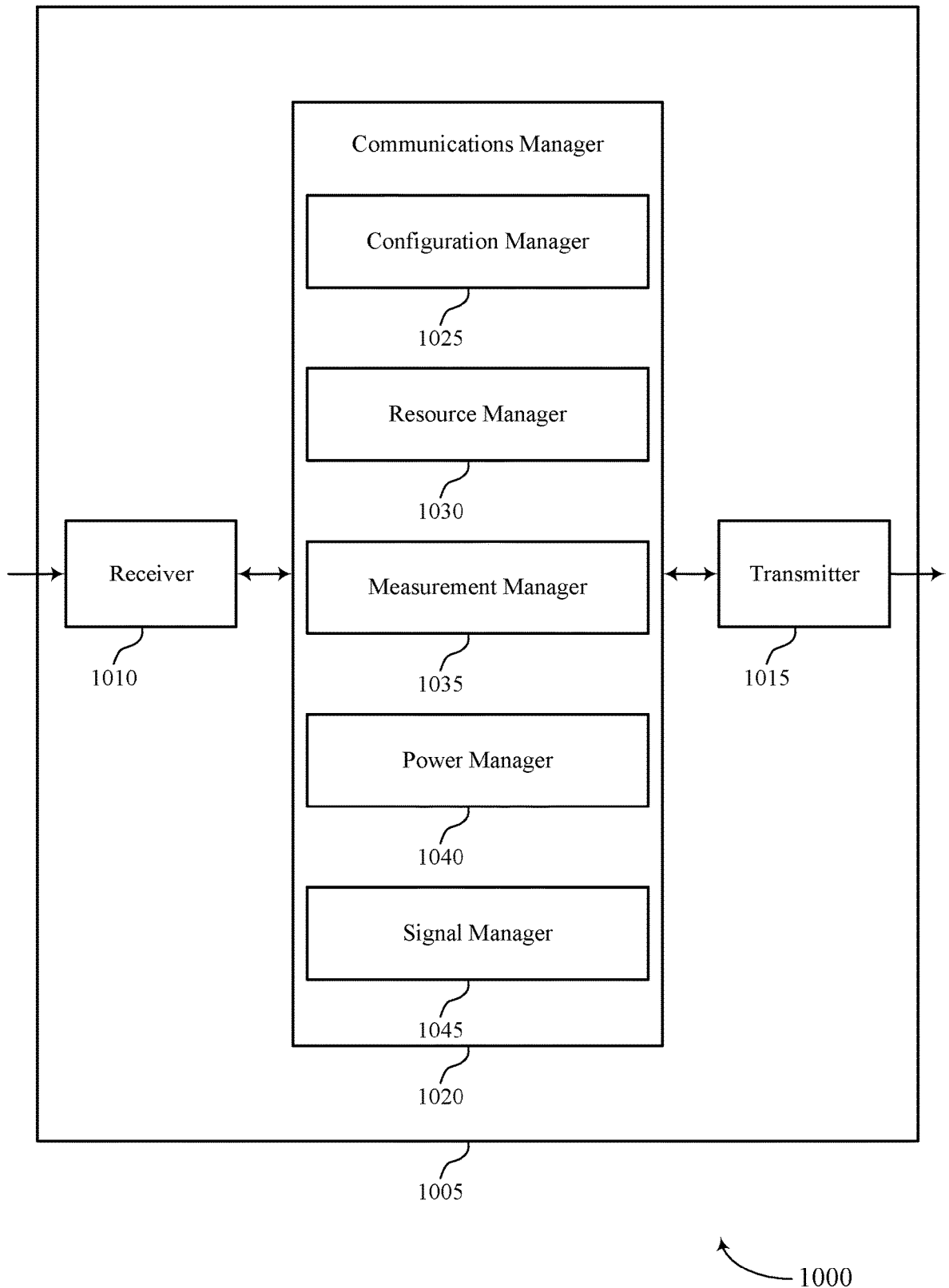

FIG. 10 shows a block diagram 1000 of a device 1005 that supports over the air digital pre-distortion measurements in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to over the air digital pre-distortion measurements). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to over the air digital pre-distortion measurements). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of over the air digital pre-distortion measurements as described herein. For example, the communications manager 1020 may include a configuration manager 1025, a resource manager 1030, a measurement manager 1035, a power manager 1040, a signal manager 1045, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The configuration manager 1025 may be configured as or otherwise support a means for transmitting, to a UE, control signaling identifying a measurement configuration for one or more non-linear estimation measurements of reference signals associated with a power amplifier configuration of the base station. The resource manager 1030 may be configured as or otherwise support a means for transmitting the reference signals on a set of resources identified by the measurement configuration. The measurement manager 1035 may be configured as or otherwise support a means for receiving, from the UE, a measurement report indicating one or more non-linear estimation measurements of reference signals performed associated with the power amplifier configuration of the base station by the UE according to the measurement configuration. The power manager 1040 may be configured as or otherwise support a means for adjusting the power amplifier configuration of the base station based on the received measurement report. The signal manager 1045 may be configured as or otherwise support a means for transmitting signals to the UE using the adjusted power amplifier configuration.

Figure 11:
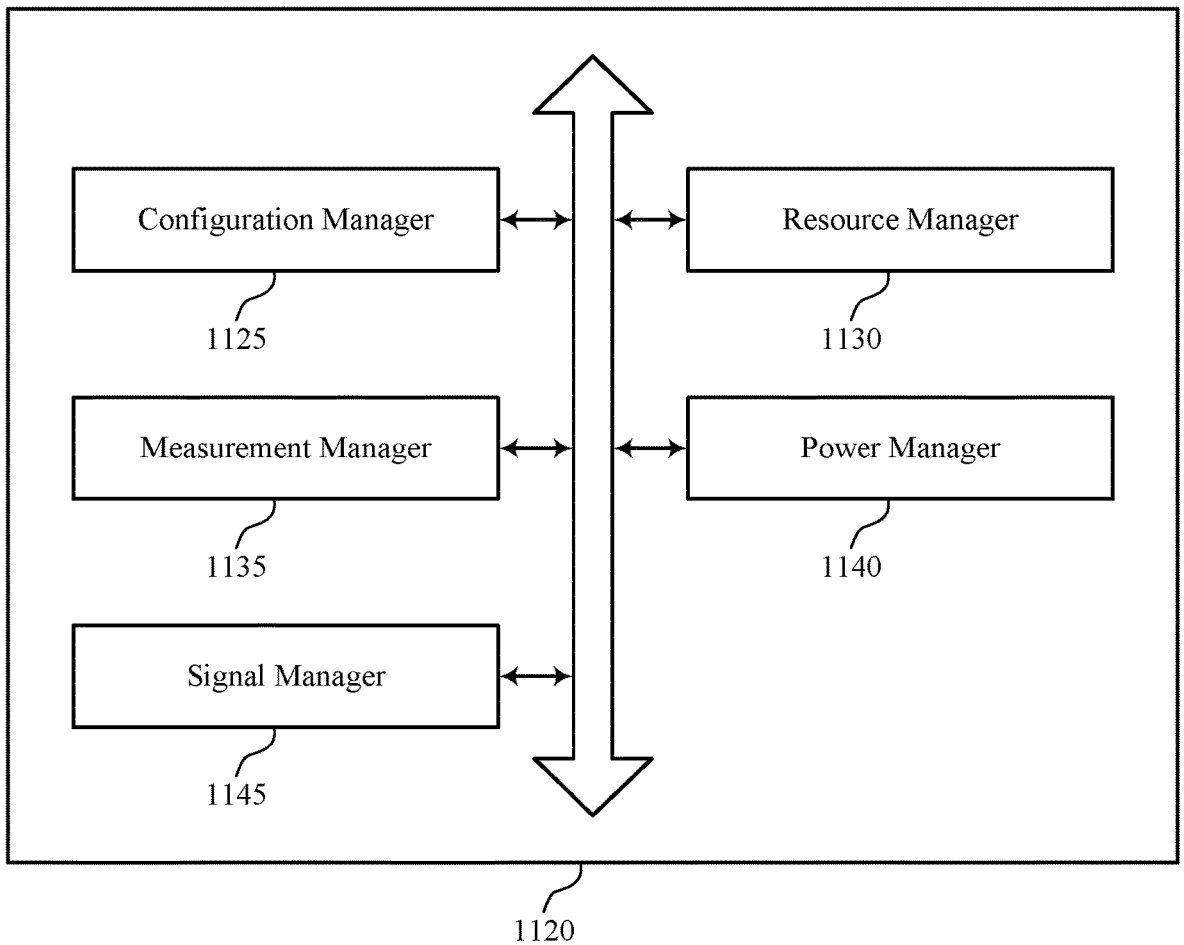
FIG. 11 shows a block diagram of a communications manager that supports over the air digital pre-distortion measurements in accordance with aspects of the present disclosure.

FIG. 11 shows a block diagram 1100 of a communications manager 1120 that supports over the air digital pre-distortion measurements in accordance with aspects of the present disclosure. The communications manager 1120 may be an example of aspects of a communications manager 920, a communications manager 1020, or both, as described herein. The communications manager 1120, or various components thereof, may be an example of means for performing various aspects of over the air digital pre-distortion measurements as described herein. For example, the communications manager 1120 may include a configuration manager 1125, a resource manager 1130, a measurement manager 1135, a power manager 1140, a signal manager 1145, or any combination thereof. Each of these components may communicate, directly or indirectly, with one another (e.g., via one or more buses).

The communications manager 1120 may support wireless communication at a base station in accordance with examples as disclosed herein. The configuration manager 1125 may be configured as or otherwise support a means for transmitting, to a UE, control signaling identifying a measurement configuration for one or more non-linear estimation measurements of reference signals associated with a power amplifier configuration of the base station. The resource manager 1130 may be configured as or otherwise support a means for transmitting the reference signals on a set of resources identified by the measurement configuration. The measurement manager 1135 may be configured as or otherwise support a means for receiving, from the UE, a measurement report indicating one or more non-linear estimation measurements of reference signals performed associated with the power amplifier configuration of the base station by the UE according to the measurement configuration. The power manager 1140 may be configured as or otherwise support a means for adjusting the power amplifier configuration of the base station based on the received measurement report. The signal manager 1145 may be configured as or otherwise support a means for transmitting signals to the UE using the adjusted power amplifier configuration.

In some examples, to support transmitting the reference signals, the resource manager 1130 may be configured as or otherwise support a means for transmitting a non-linear estimation reference signal on resources identified by the measurement configuration.

In some examples, the UE is configured to communicate data signals on a first carrier and, to support transmitting the control signaling identifying the measurement configuration, the configuration manager 1125 may be configured as or otherwise support a means for transmitting the control signaling identifying the measurement configuration, where the measurement configuration indicates that the set of resources on which the reference signals are to be transmitted include at least a second carrier adjacent the first carrier and a third carrier adjacent the first carrier.

In some examples, the UE is configured to communicate data signals on a carrier and, to support receiving the control signaling identifying the measurement configuration, the configuration manager 1125 may be configured as or otherwise support a means for transmitting the control signaling identifying the measurement configuration, where the measurement configuration indicates a first frequency region of the carrier, a second frequency region of the carrier, and a third frequency region of the carrier that has a frequency range between the first frequency region and the second frequency region, where the set of resources on which the reference signals are to be transmitted include the third frequency region, and the one or more non-linear estimation measurements are performed on the reference signals received in the third frequency region of the carrier.

In some examples, the power amplifier configuration is based a digital pre-distortion model, and the power manager 1140 may be configured as or otherwise support a means for receiving, in the measurement report or in a coefficient report, an indication of at least one coefficient of the digital pre-distortion model from the UE. In some examples, the power amplifier configuration is based a digital pre-distortion model, and the power manager 1140 may be configured as or otherwise support a means for adjusting the power amplifier configuration based on the at least one coefficient.

In some examples, the power amplifier configuration is based a digital pre-distortion model, and the power manager 1140 may be configured as or otherwise support a means for receiving, in the measurement report or in a coefficient report, an indication of whether an age of a coefficient of the digital pre-distortion model satisfies an age threshold. In some examples, the power amplifier configuration is based a digital pre-distortion model, and the power manager 1140 may be configured as or otherwise support a means for signaling the UE to update the coefficient based on the age of the coefficient failing to satisfy the age threshold.

In some examples, to support receiving the measurement report from the UE, the measurement manager 1135 may be configured as or otherwise support a means for receiving, from the UE, an indication of whether the one or more non-linear estimation measurements performed by the UE satisfy the performance threshold for the digital pre-distortion model.

In some examples, the measurement report includes an indication of an error vector magnitude, an adjacent channel leakage power ratio, a received power, a ratio of nonlinear kernel energy to linear kernel energy, a mean square error of a weighted least squares of a digital pre-distortion estimation, a subset of kernels associated with a digital pre-distortion model, or any combination thereof.

Figure 12:
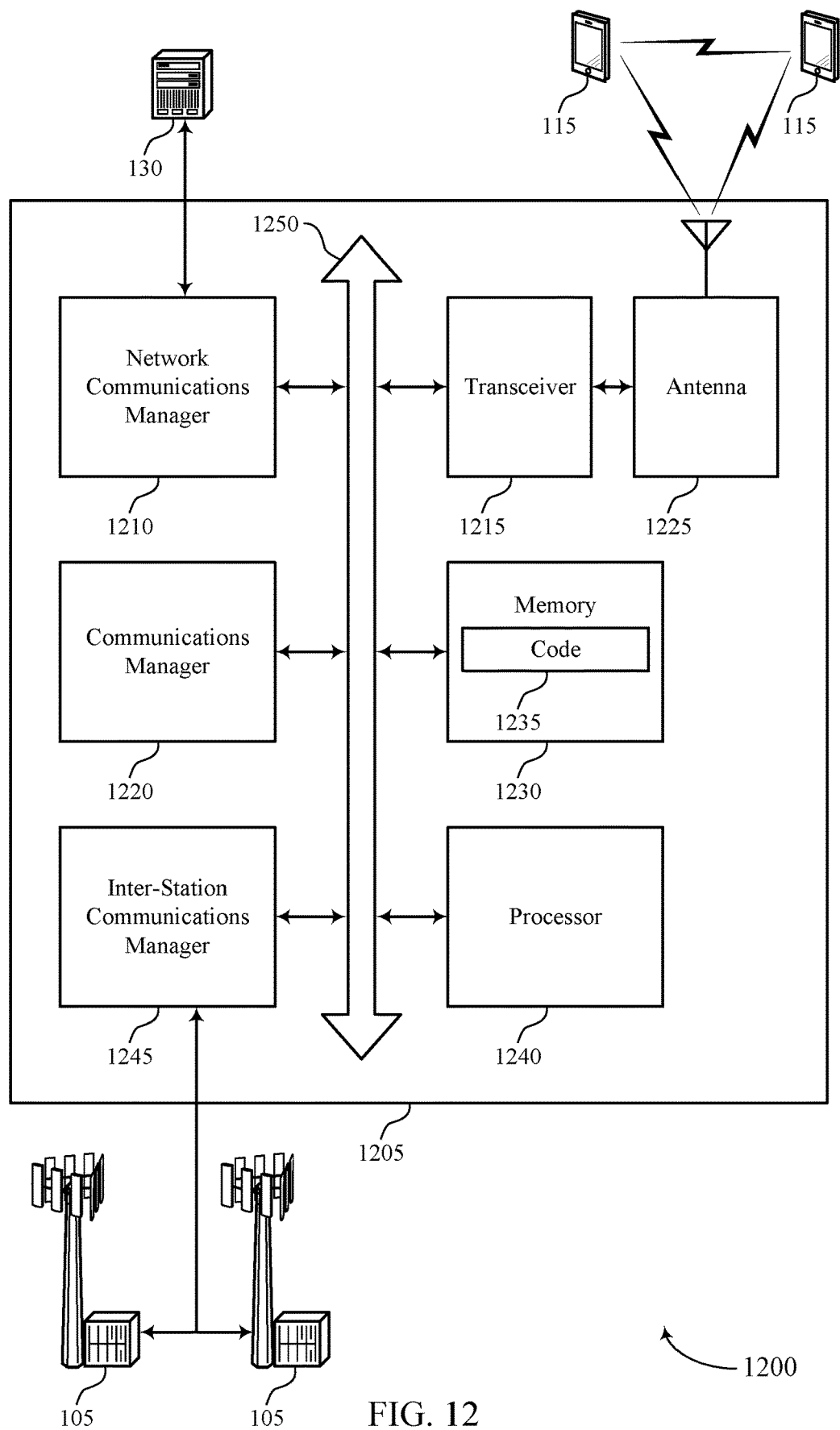
FIG. 12 shows a diagram of a system including a device that supports over the air digital pre-distortion measurements in accordance with aspects of the present disclosure.

FIG. 12 shows a diagram of a system 1200 including a device 1205 that supports over the air digital pre-distortion measurements in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting over the air digital pre-distortion measurements). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting, to a UE, control signaling identifying a measurement configuration for one or more non-linear estimation measurements of reference signals associated with a power amplifier configuration of the base station. The communications manager 1220 may be configured as or otherwise support a means for transmitting the reference signals on a set of resources identified by the measurement configuration. The communications manager 1220 may be configured as or otherwise support a means for receiving, from the UE, a measurement report indicating one or more non-linear estimation measurements of reference signals performed associated with the power amplifier configuration of the base station by the UE according to the measurement configuration. The communications manager 1220 may be configured as or otherwise support a means for adjusting the power amplifier configuration of the base station based on the received measurement report. The communications manager 1220 may be configured as or otherwise support a means for transmitting signals to the UE using the adjusted power amplifier configuration.

By including or configuring the communications manager 1220 in accordance with examples as described herein, the device 1205 may support techniques for increasing system efficiency such that device 1205 may perform over the air digital pre-distortion measurements that decrease the number of feedback measurements and computational costs of the feedback measurements (e.g., by shifting computation from a base station to a UE). Additionally, the described operations verify a quality of a DPD training process and determine an age of DPD coefficients while maintaining a performance level of the base station (e.g., maintaining a power efficiency of power available to a given channel). Additionally, the described operations decrease in-band distortion and spectral re-growth, which results in adjacent channel interference being maintained or reduced and bit error rate (BER) performance being maintained or reduced. Additionally, described techniques may result in improved communication reliability, reduced latency, improved user experience related to reduced processing, reduced power consumption, more efficient utilization of communication resources, improved coordination between devices, longer battery life, improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of over the air digital pre-distortion measurements as described herein, or the processor 1240 and the memory 1230 may be otherwise configured to perform or support such operations.

Figure 13:
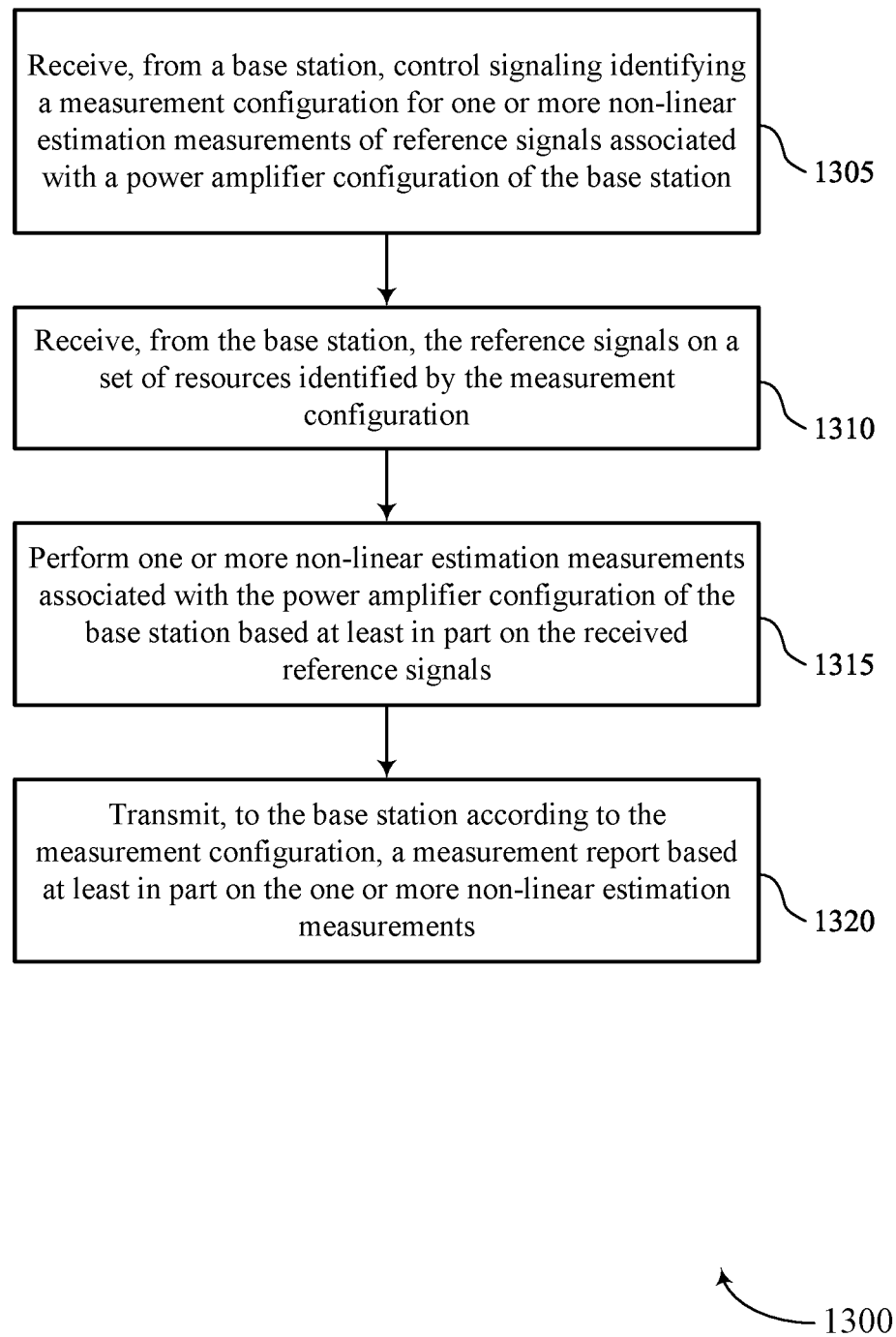
FIGS. 13 through 16 show flowcharts illustrating methods that support over the air digital pre-distortion measurements in accordance with aspects of the present disclosure.

FIG. 13 shows a flowchart illustrating a method 1300 that supports over the air digital pre-distortion measurements in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, control signaling identifying a measurement configuration for one or more non-linear estimation measurements of reference signals associated with a power amplifier configuration of the base station. The operations of 1305 may be performed in accordance with examples as disclosed herein. In some examples, aspects of the operations of 1305 may be performed by a control manager 725 as described with reference to FIG. 7.

At 1310, the method may include receiving, from the base station, the reference signals on a set of resources identified by the measurement configuration. The operations of 1310 may be performed in accordance with examples as disclosed herein. In some examples, aspects of the operations of 1310 may be performed by a reference manager 730 as described with reference to FIG. 7.

At 1315, the method may include performing one or more non-linear estimation measurements associated with the power amplifier configuration of the base station based on the received reference signals. The operations of 1315 may be performed in accordance with examples as disclosed herein. In some examples, aspects of the operations of 1315 may be performed by an estimation manager 735 as described with reference to FIG. 7.

At 1320, the method may include transmitting, to the base station according to the measurement configuration, a measurement report based on the one or more non-linear estimation measurements. The operations of 1320 may be performed in accordance with examples as disclosed herein. In some examples, aspects of the operations of 1320 may be performed by a report manager 740 as described with reference to FIG. 7.

Figure 14:
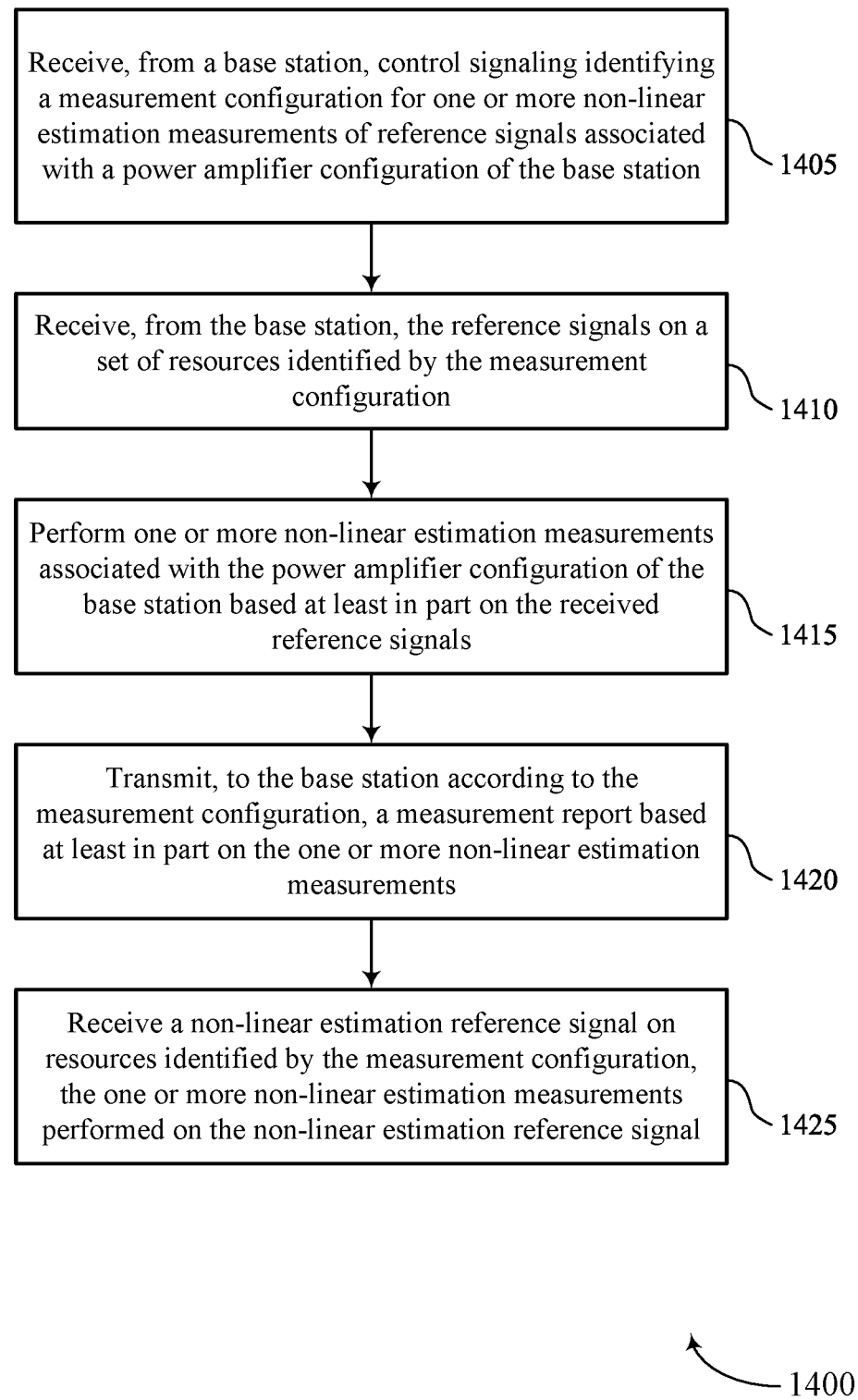

FIG. 14 shows a flowchart illustrating a method 1400 that supports over the air digital pre-distortion measurements in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, control signaling identifying a measurement configuration for one or more non-linear estimation measurements of reference signals associated with a power amplifier configuration of the base station. The operations of 1405 may be performed in accordance with examples as disclosed herein. In some examples, aspects of the operations of 1405 may be performed by a control manager 725 as described with reference to FIG. 7.

At 1410, the method may include receiving, from the base station, the reference signals on a set of resources identified by the measurement configuration. The operations of 1410 may be performed in accordance with examples as disclosed herein. In some examples, aspects of the operations of 1410 may be performed by a reference manager 730 as described with reference to FIG. 7.

At 1415, the method may include performing one or more non-linear estimation measurements associated with the power amplifier configuration of the base station based on the received reference signals. The operations of 1415 may be performed in accordance with examples as disclosed herein. In some examples, aspects of the operations of 1415 may be performed by an estimation manager 735 as described with reference to FIG. 7.

At 1420, the method may include transmitting, to the base station according to the measurement configuration, a measurement report based on the one or more non-linear estimation measurements. The operations of 1420 may be performed in accordance with examples as disclosed herein. In some examples, aspects of the operations of 1420 may be performed by a report manager 740 as described with reference to FIG. 7.

At 1425, the method may include receiving a non-linear estimation reference signal on resources identified by the measurement configuration, the one or more non-linear estimation measurements performed on the non-linear estimation reference signal. The operations of 1425 may be performed in accordance with examples as disclosed herein. In some examples, aspects of the operations of 1425 may be performed by a reference manager 730 as described with reference to FIG. 7.

Figure 15:
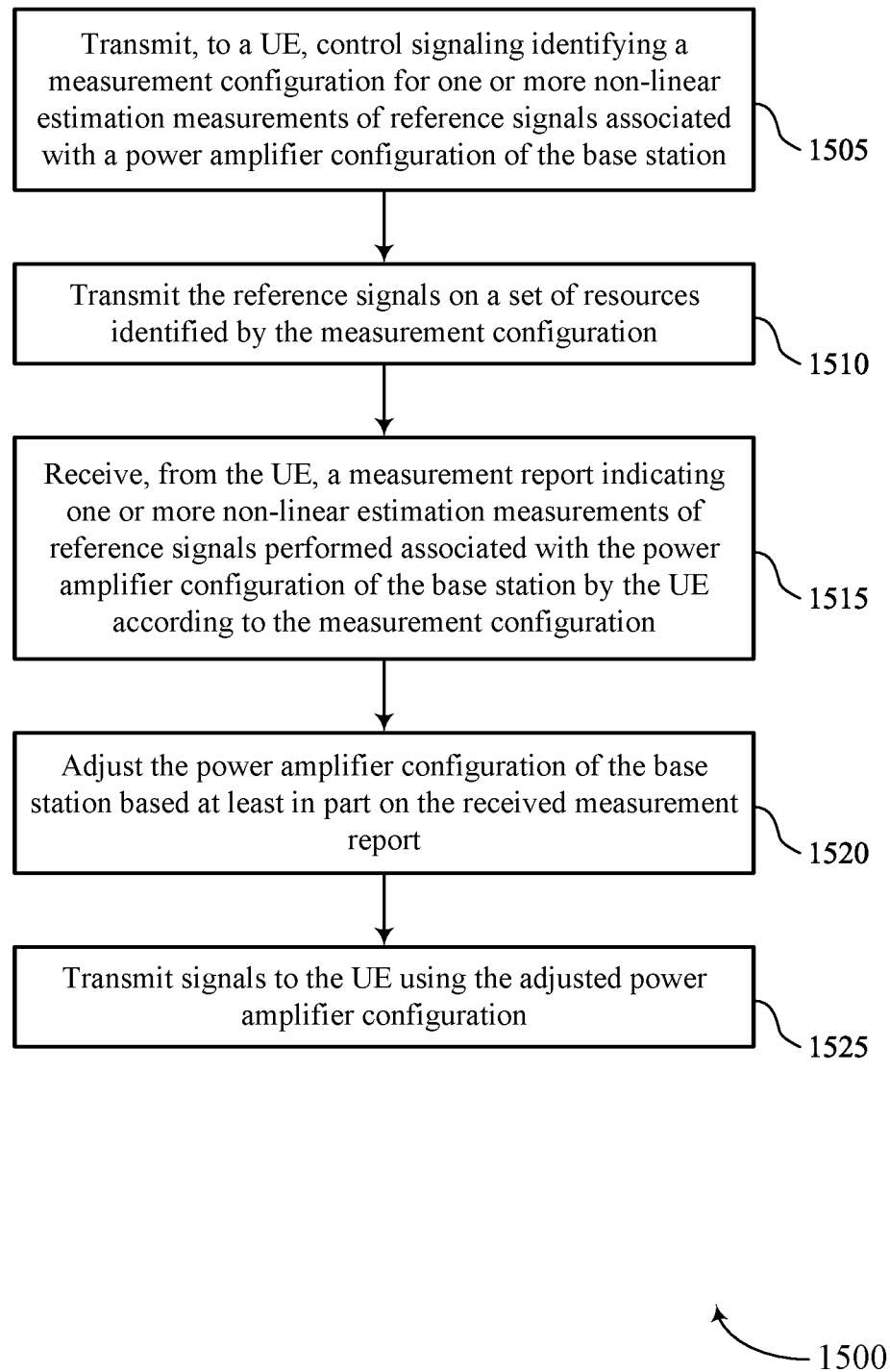

FIG. 15 shows a flowchart illustrating a method 1500 that supports over the air digital pre-distortion measurements in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, control signaling identifying a measurement configuration for one or more non-linear estimation measurements of reference signals associated with a power amplifier configuration of the base station. The operations of 1505 may be performed in accordance with examples as disclosed herein. In some examples, aspects of the operations of 1505 may be performed by a configuration manager 1125 as described with reference to FIG. 11.

At 1510, the method may include transmitting the reference signals on a set of resources identified by the measurement configuration. The operations of 1510 may be performed in accordance with examples as disclosed herein. In some examples, aspects of the operations of 1510 may be performed by a resource manager 1130 as described with reference to FIG. 11.

At 1515, the method may include receiving, from the UE, a measurement report indicating one or more non-linear estimation measurements of reference signals performed associated with the power amplifier configuration of the base station by the UE according to the measurement configuration. The operations of 1515 may be performed in accordance with examples as disclosed herein. In some examples, aspects of the operations of 1515 may be performed by a measurement manager 1135 as described with reference to FIG. 11.

At 1520, the method may include adjusting the power amplifier configuration of the base station based on the received measurement report. The operations of 1520 may be performed in accordance with examples as disclosed herein. In some examples, aspects of the operations of 1520 may be performed by a power manager 1140 as described with reference to FIG. 11.

At 1525, the method may include transmitting signals to the UE using the adjusted power amplifier configuration. The operations of 1525 may be performed in accordance with examples as disclosed herein. In some examples, aspects of the operations of 1525 may be performed by a signal manager 1145 as described with reference to FIG. 11.

Figure 16:
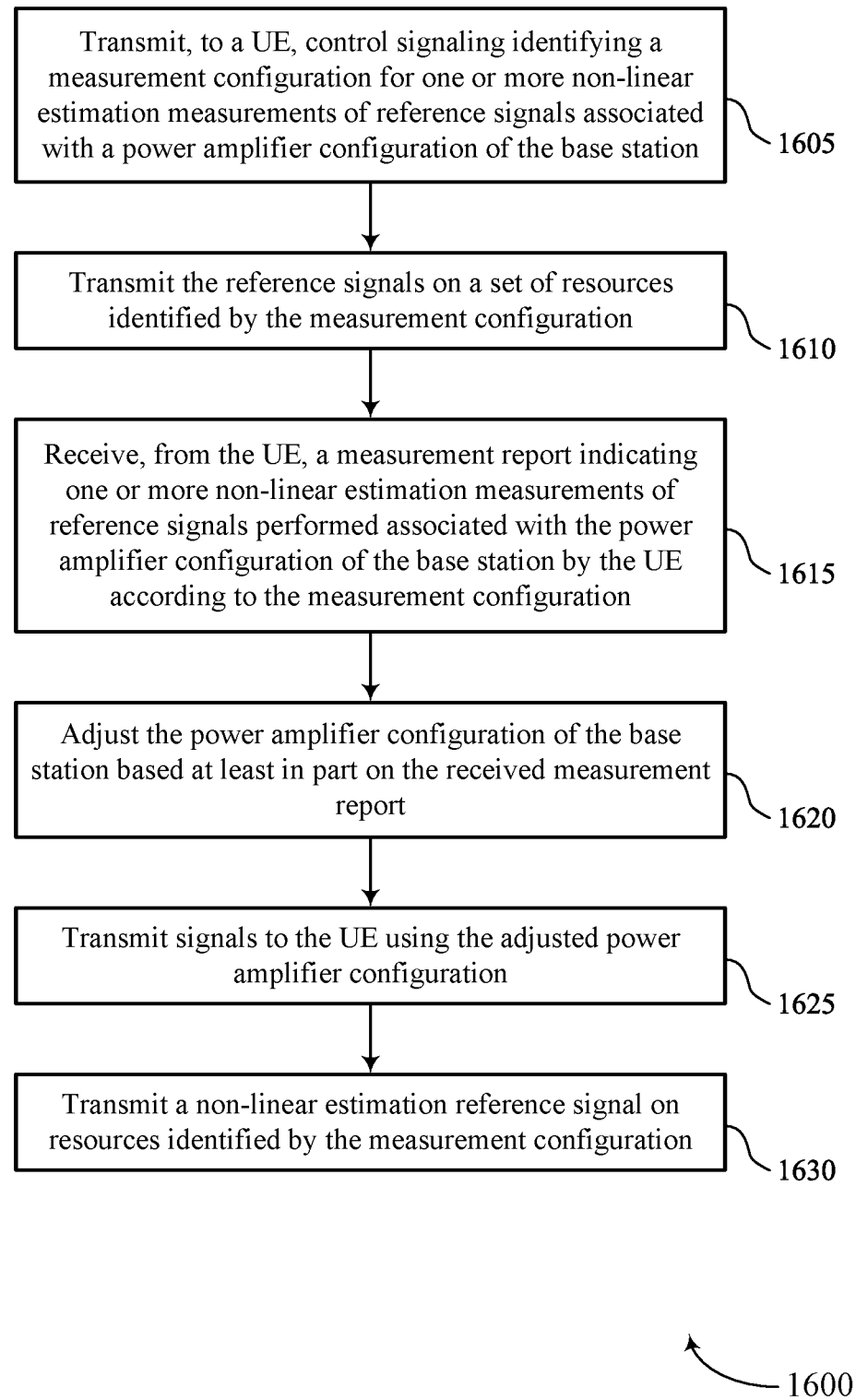

FIG. 16 shows a flowchart illustrating a method 1600 that supports over the air digital pre-distortion measurements in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, control signaling identifying a measurement configuration for one or more non-linear estimation measurements of reference signals associated with a power amplifier configuration of the base station. The operations of 1605 may be performed in accordance with examples as disclosed herein. In some examples, aspects of the operations of 1605 may be performed by a configuration manager 1125 as described with reference to FIG. 11.

At 1610, the method may include transmitting the reference signals on a set of resources identified by the measurement configuration. The operations of 1610 may be performed in accordance with examples as disclosed herein. In some examples, aspects of the operations of 1610 may be performed by a resource manager 1130 as described with reference to FIG. 11.

At 1615, the method may include receiving, from the UE, a measurement report indicating one or more non-linear estimation measurements of reference signals performed associated with the power amplifier configuration of the base station by the UE according to the measurement configuration. The operations of 1615 may be performed in accordance with examples as disclosed herein. In some examples, aspects of the operations of 1615 may be performed by a measurement manager 1135 as described with reference to FIG. 11.

At 1620, the method may include adjusting the power amplifier configuration of the base station based on the received measurement report. The operations of 1620 may be performed in accordance with examples as disclosed herein. In some examples, aspects of the operations of 1620 may be performed by a power manager 1140 as described with reference to FIG. 11.

At 1625, the method may include transmitting signals to the UE using the adjusted power amplifier configuration. The operations of 1625 may be performed in accordance with examples as disclosed herein. In some examples, aspects of the operations of 1625 may be performed by a signal manager 1145 as described with reference to FIG. 11.

At 1630, the method may include transmitting a non-linear estimation reference signal on resources identified by the measurement configuration. The operations of 1630 may be performed in accordance with examples as disclosed herein. In some examples, aspects of the operations of 1630 may be performed by a resource manager 1130 as described with reference to FIG. 11.

The following provides an overview of aspects of the present disclosure:

Aspect 1: A method for wireless communication at a UE, further comprising: receiving, from a base station, control signaling identifying a measurement configuration for one or more non-linear estimation measurements of reference signals associated with a power amplifier configuration of the base station; receiving, from the base station, the reference signals on a set of resources identified by the measurement configuration; performing one or more non-linear estimation measurements associated with the power amplifier configuration of the base station based at least in part on the received reference signals; and transmitting, to the base station according to the measurement configuration, a measurement report based at least in part on the one or more non-linear estimation measurements.

Aspect 2: The method of aspect 1, wherein receiving the reference signals comprises: receiving a non-linear estimation reference signal on resources identified by the measurement configuration, the one or more non-linear estimation measurements performed on the non-linear estimation reference signal.

Aspect 3: The method of any of aspects 1 through 2, wherein the UE is configured to communicate data signals on a first carrier, and receiving the control signaling identifying the measurement configuration comprises: receiving the control signaling identifying the measurement configuration, wherein the measurement configuration indicates that the set of resources on which the reference signals are to be transmitted comprise at least a second carrier adjacent the first carrier and a third carrier adjacent the first carrier.

Aspect 4: The method of aspect 3, further comprising: performing one or more adjacent channel leakage ratio measurements on the reference signals on the second carrier, or the third carrier, or any combination thereof, the measurement configuration indicating for the UE to perform the one or more adjacent channel leakage ratio measurements.

Aspect 5: The method of any of aspects 1 through 4, wherein the UE is configured to communicate data signals on a carrier, and receiving the control signaling identifying the measurement configuration comprises: receiving the control signaling identifying the measurement configuration, wherein the measurement configuration indicates a first frequency region of the carrier, a second frequency region of the carrier, and a third frequency region of the carrier that has a frequency range between the first frequency region and the second frequency region, wherein the set of resources on which the reference signals are to be transmitted comprise the third frequency region, and the one or more non-linear estimation measurements are performed on the reference signals received in the third frequency region of the carrier.

Aspect 6: The method of any of aspects 1 through 5, further comprising: generating at least one coefficient of a digital pre-distortion model based at least in part on the received reference signals; and transmitting an indication of the generated at least one coefficient to the base station.

Aspect 7: The method of any of aspects 1 through 6, further comprising: determining whether an age of a coefficient of a digital pre-distortion model satisfies an age threshold, wherein the measurement report indicates whether the age of the coefficient satisfies the age threshold.

Aspect 8: The method of any of aspects 1 through 7, wherein the measurement configuration indicates a performance threshold for a digital pre-distortion model, and wherein performing the one or more non-linear estimation measurements comprises: determining whether the one or more non-linear estimation measurements satisfy the performance threshold for the digital pre-distortion model; and transmitting, to the base station, an indication of whether the one or more non-linear estimation measurements satisfy the performance threshold.

Aspect 9: The method of aspect 8, wherein the measurement report comprises a 1-bit value indicating whether the one or more non-linear estimation measurements satisfy the performance threshold, the indication comprising the 1-bit value.

Aspect 10: The method of any of aspects 1 through 9, wherein performing the one or more non-linear estimation measurements comprises: performing the one or more non-linear estimation measurements to determine an error vector magnitude, an adjacent channel leakage power ratio, a received power, a ratio of nonlinear kernel energy to linear kernel energy, a mean square error of a weighted least squares of a digital pre-distortion estimation, a subset of kernels associated with a digital pre-distortion model, or any combination thereof.

Aspect 11: The method of any of aspects 1 through 10, wherein the reference signals comprise demodulation reference signals.

Aspect 12: A method for wireless communication at a base station, further comprising: transmitting, to a UE, control signaling identifying a measurement configuration for one or more non-linear estimation measurements of reference signals associated with a power amplifier configuration of the base station; transmitting the reference signals on a set of resources identified by the measurement configuration; receiving, from the UE, a measurement report indicating one or more non-linear estimation measurements of reference signals performed associated with the power amplifier configuration of the base station by the UE according to the measurement configuration; adjusting the power amplifier configuration of the base station based at least in part on the received measurement report; and transmitting signals to the UE using the adjusted power amplifier configuration.

Aspect 13: The method of aspect 12, wherein transmitting the reference signals comprises: transmitting a non-linear estimation reference signal on resources identified by the measurement configuration.

Aspect 14: The method of any of aspects 12 through 13, wherein the UE is configured to communicate data signals on a first carrier, and transmitting the control signaling identifying the measurement configuration comprises: transmitting the control signaling identifying the measurement configuration, wherein the measurement configuration indicates that the set of resources on which the reference signals are to be transmitted comprise at least a second carrier adjacent the first carrier and a third carrier adjacent the first carrier.

Aspect 15: The method of any of aspects 12 through 14, wherein the UE is configured to communicate data signals on a carrier, and receiving the control signaling identifying the measurement configuration comprises: transmitting the control signaling identifying the measurement configuration, wherein the measurement configuration indicates a first frequency region of the carrier, a second frequency region of the carrier, and a third frequency region of the carrier that has a frequency range between the first frequency region and the second frequency region, wherein the set of resources on which the reference signals are to be transmitted comprise the third frequency region, and the one or more non-linear estimation measurements are performed on the reference signals received in the third frequency region of the carrier.

Aspect 16: The method of any of aspects 12 through 15, wherein the power amplifier configuration is based a digital pre-distortion model, the method further comprising: receiving, in the measurement report or in a coefficient report, an indication of at least one coefficient of the digital pre-distortion model from the UE; and adjusting the power amplifier configuration based at least in part on the at least one coefficient.

Aspect 17: The method of any of aspects 12 through 16, wherein the power amplifier configuration is based a digital pre-distortion model, the method further comprising: receiving, in the measurement report or in a coefficient report, an indication of whether an age of a coefficient of the digital pre-distortion model satisfies an age threshold; and signaling the UE to update the coefficient based at least in part on the age of the coefficient failing to satisfy the age threshold.

Aspect 18: The method of any of aspects 12 through 17, wherein the measurement configuration indicates a performance threshold for a digital pre-distortion model, and wherein receiving the measurement report from the UE further comprises: receiving, from the UE, an indication of whether the one or more non-linear estimation measurements performed by the UE satisfy the performance threshold for the digital pre-distortion model.

Aspect 19: The method of any of aspects 12 through 18, wherein the measurement report comprises an indication of an error vector magnitude, an adjacent channel leakage power ratio, a received power, a ratio of nonlinear kernel energy to linear kernel energy, a mean square error of a weighted least squares of a digital pre-distortion estimation, a subset of kernels associated with a digital pre-distortion model, or any combination thereof.

Aspect 20: An apparatus for wireless communication at a UE, comprising a processor; memory coupled with the processor; and instructions stored in the memory and executable by the processor to cause the apparatus to perform a method of any of aspects 1 through 11.

Aspect 21: An apparatus for wireless communication at a UE, comprising at least one means for performing a method of any of aspects 1 through 11.

Aspect 22: A non-transitory computer-readable medium storing code for wireless communication at a UE, the code comprising instructions executable by a processor to perform a method of any of aspects 1 through 11.

Aspect 23: An apparatus for wireless communication at a base station, comprising a processor; memory coupled with the processor; and instructions stored in the memory and executable by the processor to cause the apparatus to perform a method of any of aspects 12 through 19.

Aspect 24: An apparatus for wireless communication at a base station, comprising at least one means for performing a method of any of aspects 12 through 19.

Aspect 25: A non-transitory computer-readable medium storing code for wireless communication at a base station, the code comprising instructions executable by a processor to perform a method of any of aspects 12 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), further comprising:
   receiving, from a base station, control signaling identifying a measurement configuration for one or more non-linear estimation measurements of reference signals associated with a power amplifier configuration of the base station;
   receiving, from the base station, the reference signals on a set of resources identified by the measurement configuration;
   performing one or more non-linear estimation measurements associated with the power amplifier configuration of the base station based at least in part on the received reference signals; and
   transmitting, to the base station according to the measurement configuration, a measurement report based at least in part on the one or more non-linear estimation measurements.

2. The method of claim 1, wherein receiving the reference signals comprises:
   receiving a non-linear estimation reference signal on resources identified by the measurement configuration, the one or more non-linear estimation measurements performed on the non-linear estimation reference signal.

3. The method of claim 1, wherein the UE is configured to communicate data signals on a first carrier, and receiving the control signaling identifying the measurement configuration comprises:
   receiving the control signaling identifying the measurement configuration, wherein the measurement configuration indicates that the set of resources on which the reference signals are to be transmitted comprise at least a second carrier adjacent the first carrier and a third carrier adjacent the first carrier.

4. The method of claim 3, further comprising:
   performing one or more adjacent channel leakage ratio measurements on the reference signals on the second carrier, or the third carrier, or any combination thereof, the measurement configuration indicating for the UE to perform the one or more adjacent channel leakage ratio measurements.

5. The method of claim 1, wherein the UE is configured to communicate data signals on a carrier, and receiving the control signaling identifying the measurement configuration comprises:
   receiving the control signaling identifying the measurement configuration, wherein the measurement configuration indicates a first frequency region of the carrier, a second frequency region of the carrier, and a third frequency region of the carrier that has a frequency range between the first frequency region and the second frequency region, wherein the set of resources on which the reference signals are to be transmitted comprise the third frequency region, and the one or more non-linear estimation measurements are performed on the reference signals received in the third frequency region of the carrier.

6. The method of claim 1, further comprising:
   generating at least one coefficient of a digital pre-distortion model based at least in part on the received reference signals; and
   transmitting an indication of the generated at least one coefficient to the base station.

7. The method of claim 1, further comprising:
determining whether an age of a coefficient of a digital pre-distortion model satisfies an age threshold, wherein the measurement report indicates whether the age of the coefficient satisfies the age threshold.

8. The method of claim 1, wherein the measurement configuration indicates a performance threshold for a digital pre-distortion model, and wherein performing the one or more non-linear estimation measurements comprises:
determining whether the one or more non-linear estimation measurements satisfy the performance threshold for the digital pre-distortion model; and
transmitting, to the base station, an indication of whether the one or more non-linear estimation measurements satisfy the performance threshold.

9. The method of claim 8, wherein the measurement report comprises a 1-bit value indicating whether the one or more non-linear estimation measurements satisfy the performance threshold, the indication comprising the 1-bit value.

10. The method of claim 1, wherein performing the one or more non-linear estimation measurements comprises:
performing the one or more non-linear estimation measurements to determine an error vector magnitude, an adjacent channel leakage power ratio, a received power, a ratio of nonlinear kernel energy to linear kernel energy, a mean square error of a weighted least squares of a digital pre-distortion estimation, a subset of kernels associated with a digital pre-distortion model, or any combination thereof.

11. The method of claim 1, wherein the reference signals comprise demodulation reference signals.

12. A method for wireless communication at a base station, further comprising:
transmitting, to a user equipment (UE), control signaling identifying a measurement configuration for one or more non-linear estimation measurements of reference signals associated with a power amplifier configuration of the base station;
transmitting the reference signals on a set of resources identified by the measurement configuration;
receiving, from the UE, a measurement report indicating one or more non-linear estimation measurements of reference signals performed associated with the power amplifier configuration of the base station by the UE according to the measurement configuration;
adjusting the power amplifier configuration of the base station based at least in part on the received measurement report; and
transmitting signals to the UE using the adjusted power amplifier configuration.

13. The method of claim 12, wherein transmitting the reference signals comprises:
transmitting a non-linear estimation reference signal on resources identified by the measurement configuration.

14. The method of claim 12, wherein the UE is configured to communicate data signals on a first carrier, and transmitting the control signaling identifying the measurement configuration comprises:
transmitting the control signaling identifying the measurement configuration, wherein the measurement configuration indicates that the set of resources on which the reference signals are to be transmitted comprise at least a second carrier adjacent the first carrier and a third carrier adjacent the first carrier.

15. The method of claim 12, wherein the UE is configured to communicate data signals on a carrier, and receiving the control signaling identifying the measurement configuration comprises:
transmitting the control signaling identifying the measurement configuration, wherein the measurement configuration indicates a first frequency region of the carrier, a second frequency region of the carrier, and a third frequency region of the carrier that has a frequency range between the first frequency region and the second frequency region, wherein the set of resources on which the reference signals are to be transmitted comprise the third frequency region, and the one or more non-linear estimation measurements are performed on the reference signals received in the third frequency region of the carrier.

16. The method of claim 12, wherein the power amplifier configuration is based a digital pre-distortion model, the method further comprising:
receiving, in the measurement report or in a coefficient report, an indication of at least one coefficient of the digital pre-distortion model from the UE; and
adjusting the power amplifier configuration based at least in part on the at least one coefficient.

17. The method of claim 12, wherein the power amplifier configuration is based a digital pre-distortion model, the method further comprising:
receiving, in the measurement report or in a coefficient report, an indication of whether an age of a coefficient of the digital pre-distortion model satisfies an age threshold; and
signaling the UE to update the coefficient based at least in part on the age of the coefficient failing to satisfy the age threshold.

18. The method of claim 12, wherein the measurement configuration indicates a performance threshold for a digital pre-distortion model, and wherein receiving the measurement report from the UE further comprises:
receiving, from the UE, an indication of whether the one or more non-linear estimation measurements performed by the UE satisfy the performance threshold for the digital pre-distortion model.

19. The method of claim 12, wherein the measurement report comprises an indication of an error vector magnitude, an adjacent channel leakage power ratio, a received power, a ratio of nonlinear kernel energy to linear kernel energy, a mean square error of a weighted least squares of a digital pre-distortion estimation, a subset of kernels associated with a digital pre-distortion model, or any combination thereof.

20. An apparatus for wireless communication at a user equipment (UE), comprising:
a processor;
memory coupled with the processor; and
instructions stored in the memory and executable by the processor to cause the apparatus to:
receive, from a base station, control signaling identifying a measurement configuration for one or more non-linear estimation measurements of reference signals associated with a power amplifier configuration of the base station;
receive, from the base station, the reference signals on a set of resources identified by the measurement configuration;
perform one or more non-linear estimation measurements associated with the power amplifier configuration of the base station based at least in part on the received reference signals; and transmit, to the base station according to the measurement configuration, a measurement report based at least in part on the one or more non-linear estimation measurements.

21. The apparatus of claim 20, wherein the instructions to receive the reference signals are executable by the processor to cause the apparatus to:
receive a non-linear estimation reference signal on resources identified by the measurement configuration, the one or more non-linear estimation measurements performed on the non-linear estimation reference signal.

22. The apparatus of claim 20, wherein the UE is configured to communicate data signals on a first carrier, and the instructions to receive the control signaling identifying the measurement configuration are executable by the processor to cause the apparatus to:
receive the control signaling identifying the measurement configuration, wherein the measurement configuration indicates that the set of resources on which the reference signals are to be transmitted comprise at least a second carrier adjacent the first carrier and a third carrier adjacent the first carrier.

23. The apparatus of claim 22, wherein the instructions are further executable by the processor to cause the apparatus to:
perform one or more adjacent channel leakage ratio measurements on the reference signals on the second carrier, or the third carrier, or any combination thereof, the measurement configuration indicating for the UE to perform the one or more adjacent channel leakage ratio measurements.

24. The apparatus of claim 20, wherein the UE is configured to communicate data signals on a carrier, and the instructions to receive the control signaling identifying the measurement configuration are executable by the processor to cause the apparatus to:
receive the control signaling identifying the measurement configuration, wherein the measurement configuration indicates a first frequency region of the carrier, a second frequency region of the carrier, and a third frequency region of the carrier that has a frequency range between the first frequency region and the second frequency region, wherein the set of resources on which the reference signals are to be transmitted comprise the third frequency region, and the one or more non-linear estimation measurements are performed on the reference signals received in the third frequency region of the carrier.

25. The apparatus of claim 20, wherein the instructions are further executable by the processor to cause the apparatus to:
generate at least one coefficient of a digital pre-distortion model based at least in part on the received reference signals; and
transmit an indication of the generated at least one coefficient to the base station.

26. The apparatus of claim 20, wherein the instructions are further executable by the processor to cause the apparatus to:
determine whether an age of a coefficient of a digital pre-distortion model satisfies an age threshold, wherein the measurement report indicates whether the age of the coefficient satisfies the age threshold.

27. The apparatus of claim 20, wherein the instructions to perform the one or more non-linear estimation measurements are executable by the processor to cause the apparatus to:
determine whether the one or more non-linear estimation measurements satisfy the performance threshold for the digital pre-distortion model; and
transmit, to the base station, an indication of whether the one or more non-linear estimation measurements satisfy the performance threshold.

28. The apparatus of claim 27, wherein the measurement report comprises a 1-bit value indicating whether the one or more non-linear estimation measurements satisfy the performance threshold, the indication comprising the 1-bit value.

29. An apparatus for wireless communication at a base station, comprising:
a processor;
memory coupled with the processor; and
instructions stored in the memory and executable by the processor to cause the apparatus to:
transmit, to a user equipment (UE), control signaling identifying a measurement configuration for one or more non-linear estimation measurements of reference signals associated with a power amplifier configuration of the base station;
transmit the reference signals on a set of resources identified by the measurement configuration;
receive, from the UE, a measurement report indicating one or more non-linear estimation measurements of reference signals performed associated with the power amplifier configuration of the base station by the UE according to the measurement configuration;
adjust the power amplifier configuration of the base station based at least in part on the received measurement report; and
transmit signals to the UE using the adjusted power amplifier configuration.

30. The apparatus of claim 29, wherein the instructions to transmit the reference signals are executable by the processor to cause the apparatus to:
transmit a non-linear estimation reference signal on resources identified by the measurement configuration.

* * * * *